US010616399B1

(12) United States Patent
Blaha, Jr. et al.

(10) Patent No.: US 10,616,399 B1
(45) Date of Patent: *Apr. 7, 2020

(54) ESTIMATING ELEVATION OF A WIRELESS TERMINAL, BASED ON THE MEASUREMENT BIAS OF A PRESSURE REFERENCE THAT IS IN A SECOND REGION, BASED ON THE MEASUREMENT BIAS OF A PRESSURE REFERENCE THAT IS IN A FIRST REGION

(71) Applicant: Polaris Wireless, Inc., Mountain View, CA (US)

(72) Inventors: Jerome Arthur Blaha, Jr., Redwood City, CA (US); Scot Douglas Gordon, Remond, CA (US); Jonathan Shiao-en Lu, Cupertino, CA (US); Jeffrey Noel Wu, Santa Clara, CA (US); Jian Zhu, Tustin, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,166

(22) Filed: Oct. 1, 2019

Related U.S. Application Data

(63) Continuation of application No. 16/369,511, filed on Mar. 29, 2019, now Pat. No. 10,462,282.

(51) Int. Cl.
*H04M 1/725* (2006.01)
*H04W 4/90* (2018.01)
(Continued)

(52) U.S. Cl.
CPC .......... *H04M 1/72569* (2013.01); *G01C 5/00* (2013.01); *G01C 5/06* (2013.01); *H04M 1/725* (2013.01);
(Continued)

(58) Field of Classification Search
CPC ....... H04W 4/02; H04W 4/025; H04W 88/00; H04W 88/02; H04W 4/04; H04W 88/08;
(Continued)

(56) References Cited

U.S. PATENT DOCUMENTS 9,329,036 B2    5/2016  Garin et al.
9,810,548 B2 * 11/2017  Gunnarsson et al. . G01C 25/00
(Continued)

OTHER PUBLICATIONS

Office action issued in U.S. Appl. No. 16/369,511, dated Jun. 28, 2019.
(Continued)

*Primary Examiner* — Meless N Zewdu
(74) *Attorney, Agent, or Firm* — McGeary Cukor LLC; Kenneth Ottesen; Jason Paul DeMont

(57) ABSTRACT

A location engine that estimates the barometric pressure measurement bias of a pressure station reference, such as an airport pressure station, resulting in an improved estimate of the elevation of a wireless terminal. The location engine generates the estimate of bias of barometric pressure by comparing i) the outdoor barometric pressure measured by the airport pressure station at its unknown height above mean sea level (MSL) and ii) the expected outdoor barometric pressure derived from the pressure measurements from an already-calibrated pressure station, while accounting for the known height of the already-calibrated pressure station. The expected outdoor measurements correspond to a derived height above MSL of the airport pressure station. Subsequently, the location engine generates an estimate of the elevation of the wireless terminal by accounting for the estimate of measurement bias of the airport pressure station.

21 Claims, 15 Drawing Sheets

(51) Int. Cl.

| | |
|---|---|
| *G01C 5/06* | (2006.01) |
| *H04W 4/029* | (2018.01) |
| *H04W 4/38* | (2018.01) |
| *G01C 5/00* | (2006.01) |
| *H04W 4/33* | (2018.01) |
| *H04W 4/021* | (2018.01) |

(52) U.S. Cl.
CPC ........... *H04W 4/021* (2013.01); *H04W 4/029* (2018.02); *H04W 4/33* (2018.02); *H04W 4/38* (2018.02); *H04W 4/90* (2018.02); *H04M 2250/12* (2013.01)

(58) Field of Classification Search
CPC ..... H04W 76/50; H04W 64/00; H04W 24/10; H04W 64/003; H04W 64/006; H04W 4/029; H04W 4/38; H04W 4/90; H04W 4/043; H04W 4/33; H04W 24/00; H04W 56/0015; H04W 56/0095; H04W 4/00; H04W 4/021; H04W 4/026; H04W 4/42; H04W 16/00; H04W 16/18; H04W 16/20; H04W 76/00; H04W 88/04; H04W 88/18; G01C 5/00; G01C 5/06; G01C 7/02; G01C 21/362; G01C 3/30; G01C 5/005; H04L 67/18; G01L 27/00; G01L 27/005; G01L 25/00; G01L 27/002; H04M 1/72569; H04M 2250/12; H04M 1/725; H04M 1/72572; H04M 2242/30; G01S 5/0263

See application file for complete search history.

(56) References Cited

U.S. PATENT DOCUMENTS

| | | | | |
|---|---|---|---|---|
| 10,094,905 | B2 | 10/2018 | Gum et al. | |
| 10,367,932 | B1* | 7/2019 | Zhu et al. | H04M 1/72569 |
| 10,412,211 | B1* | 9/2019 | Zhu et al. | H04M 1/72569 |
| 10,462,282 | B1* | 10/2019 | Blaha et al. | H04M 1/72569 |
| 2009/0286556 | A1 | 11/2009 | Yumoto et al. | |
| 2011/0224925 | A1* | 9/2011 | Tsubata | 702/60 |
| 2012/0253674 | A1 | 10/2012 | Kamiwada | |
| 2013/0226375 | A1* | 8/2013 | Peter et al. | 701/10 |
| 2013/0325385 | A1 | 12/2013 | Shin et al. | |
| 2014/0174175 | A1* | 6/2014 | Chun et al. | G01C 5/06 |
| 2014/0200846 | A1* | 7/2014 | Wachter et al. | G01C 5/06 |
| 2014/0323160 | A1* | 10/2014 | Venkatraman et al. | H04W 4/028 |
| 2015/0044464 | A1 | 2/2015 | Joo et al. | |
| 2015/0133145 | A1* | 5/2015 | Palanki et al. | H04W 64/006 |
| 2015/0247917 | A1* | 9/2015 | Gum et al. | G01S 5/0263 |
| 2015/0309155 | A1 | 10/2015 | Belloni et al. | |
| 2015/0317905 | A1* | 11/2015 | Bourret et al. | G08G 5/0086 |
| 2016/0044464 | A1* | 2/2016 | De Lorenzo et al. | H04W 4/025 |
| 2016/0047648 | A1* | 2/2016 | Edge et al. | G01C 5/06 |
| 2016/0047649 | A1* | 2/2016 | Edge et al. | G01C 5/06 |
| 2016/0102995 | A1* | 4/2016 | Gum et al. | G01C 25/00 |
| 2016/0245716 | A1* | 8/2016 | Gum et al. | G01L 27/005 |
| 2016/0316344 | A1 | 10/2016 | Harikae | |
| 2017/0234756 | A1 | 8/2017 | Youssef et al. | |
| 2018/0031388 | A1* | 2/2018 | Gunnarsson et al. | G01C 25/00 |
| 2018/0094998 | A1* | 4/2018 | Yousef et al. | G01L 27/005 |
| 2018/0274919 | A1* | 9/2018 | Pan | G01C 5/06 |
| 2018/0283861 | A1* | 10/2018 | Kourogi et al. | G01C 5/06 |
| 2019/0108760 | A1* | 4/2019 | Krishna et al. | G08G 5/0047 |
| 2019/0313219 | A1* | 10/2019 | Zhu et al. | H04W 4/33 |

OTHER PUBLICATIONS

"Notice of Allowance, issued in U.S. Appl. No. 16/369,511", dated Sep. 5, 2019.

* cited by examiner

ESTIMATING ELEVATION OF A WIRELESS TERMINAL, BASED ON THE MEASUREMENT BIAS OF A PRESSURE REFERENCE THAT IS IN A SECOND REGION, BASED ON THE MEASUREMENT BIAS OF A PRESSURE REFERENCE THAT IS IN A FIRST REGION

CROSS REFERENCE TO RELATED APPLICATIONS

This application is related to "Estimating the Elevation of a Wireless Terminal Based on Determining the Measurement Bias of a Pressure Reference," U.S. application Ser. No. 16/369,511, incorporated by reference herein.

FIELD OF THE INVENTION

The present invention relates to telecommunications in general and, more particularly, to a technique for determining the measurement bias of a pressure reference, such as an outdoor pressure station, and estimating the elevation of a wireless terminal based on the pressure reference having been corrected for the measurement bias.

BACKGROUND OF THE INVENTION

The salient advantage of wireless telecommunications over wireline telecommunications is that the user of the wireless terminal is afforded the opportunity to use his or her terminal anywhere. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal. In accordance with some techniques, the location of a wireless terminal is estimated, at least in part, from signal measurements that are reported by the wireless terminal. The reported measurements are of signals measured by the wireless terminal that are transmitted by one or more base stations and/or by Global Navigation Satellite System (GNSS) satellites, such as Global Positioning System (GPS) satellites. In order for these techniques to work, at least some of the transmitted signals have to be strong enough to allow for accurate measurement by the wireless terminal and for reliable processing by the particular estimation technique. Some of these techniques work well even in environments where the measured strengths of the different signals vary significantly, such as where signal obstructions are present, including natural obstructions such as mountains and artificial obstructions such as buildings.

There are also techniques in the prior art for estimating the elevation of a wireless terminal. Some of these techniques rely on the relationship between barometric pressure, $P_{OBJ}$, and elevation, $Z_{OBJ}$, according to the formula:

$$Z_{OBJ} = -H_{OUT} \cdot \ln\left(\frac{P_{OBJ}}{P_W}\right) + Z_W \qquad \text{(Eq. 1)}$$

wherein:
  $H_{OUT}$ is the outdoor scale height of the atmosphere, which is the elevation at which the atmospheric pressure has decreased to $e^{-1}$ times its value at mean sea level (e.g., approximately 8400 meters) and is based on outdoor temperature at a pressure station reference.
  $P_{OBJ}$ is the relevant measurement of barometric pressure at the elevation of interest,
  $P_W$ is the measurement of atmospheric pressure at the pressure station reference, and
  $Z_W$ is the elevation of the pressure station reference.

It is well known in the art how to estimate the elevation of an object using Equation 1. For example, it is well known in the art how to estimate the elevation of a wireless terminal using Equation 1, in which barometric pressure measurements made by the wireless terminal can be used.

Such estimates of elevation based on barometric pressure, however, can be inaccurate for a variety of reasons. For example, the reference atmospheric pressure $P_W$, which is often provided by a pressure station at a nearby airport, often has a measurement bias error. There are historical reasons for this type of error: until relatively recently, airport pressure stations only reported atmospheric pressure to a resolution of 0.01 inches of mercury (inHg), which corresponds to almost three yards of height. In an aviation context, this level of reporting resolution has been sufficient.

Even though current generation pressure stations are capable of better reporting resolution than what has been required for aviation purposes, measurement bias error is often still present at airport, and other, pressure stations. Although the measurement bias error might be acceptable in an aviation context, the same amount of error is unacceptable in other contexts. A context in which the error is problematic is in an emergency response system, which often needs to ascertain the elevation of a person or object, such as within a building, to within a few feet of distance.

Furthermore, the published reference elevation $Z_W$ of an airport pressure station is often unreliable as well and also unacceptable in certain situations that require higher accuracy in the estimation of an object's elevation.

As can be seen in Equation 1, an incorrect value of the reference atmospheric pressure $P_W$ or the reference elevation $Z_W$ can result in an inaccurate estimate of elevation.

SUMMARY OF THE INVENTION

A particular problem exists in using an existing pressure station as a pressure reference, such as an airport pressure station or a weather-monitoring pressure station, for the purpose of estimating the elevation of a wireless terminal, such as a smartphone. The problem is that the airport pressure station is often physically inaccessible to the providers of third-party applications such as position determination for emergency responders. Indeed, although the data being provided by an airport pressure station is publicly available, such as through the National Weather Service (NWS), the data itself is only as good as the level of calibration of the measuring equipment at the airport pressure station. In other words, the users of the data have limited, if any, control over the quality of the data being reported. Therefore, what is needed is an improvement in the quality of the data being reported that does not necessarily require direct calibration of, or physical access to, the reporting equipment within a pressure station reference.

The present invention enables the pressure measurement bias of a barometric sensor at a pressure station reference, to be identified and compensated for, resulting in calibrated pressure measurements and an improved estimate of elevation of a wireless terminal. In accordance with the illustrative embodiment of the present invention, a location engine disclosed herein generates an estimate of the measurement bias and/or the reference elevation. This is based, in part, on the pressure measurements of one or more already-calibrated pressure references that are representative of, but not necessarily co-located with, the uncalibrated pressure station, such as an airport pressure station.

The location engine generates the estimate of bias of barometric pressure by comparing i) the outdoor barometric pressure measured by the airport pressure station at its unknown height above mean sea level (MSL) and ii) the expected outdoor barometric pressure derived from the pressure measurements from the already-calibrated pressure station, while accounting for the known height of the already-calibrated pressure station. The expected outdoor measurements correspond to a derived height above MSL of the airport pressure station. The location engine uses outdoor pressure measurements made by the already-calibrated pressure station that correspond in time to those made by the as-yet-uncalibrated airport pressure station.

In essence, the known height of the already-calibrated pressure station above MSL, or above a different predetermined reference level, serves as a ground truth that can be used by the location engine to infer information about the airport pressure station. Once the already-calibrated pressure station serves its purpose in calibrating the airport pressure station, it can be removed from the monitoring site. This enables an already-calibrated pressure station to be in the form of a transportable handset, which can be parked at the airport, but not necessarily co-located in the immediate vicinity of the airport pressure station equipment, which is typically off-limits to a third-party user of the airport pressure station data.

After the location engine has determined the measurement bias of the airport pressure station, the location engine receives i) a measurement of barometric pressure at a wireless terminal of interest and ii) a subsequent measurement of barometric pressure at the airport pressure station. The location engine generates an estimate of the elevation of the wireless terminal based on (i) the measurement of barometric pressure at the wireless terminal, (ii) the measurement of barometric pressure at the pressure station, and (iii) the estimate of measurement bias previously generated. In particular, the measurement of barometric pressure made by the pressure station is adjusted by the estimate of bias, thereby resulting in a calibrated measurement.

In conceiving of the invention, the inventors had an insight that if an airport pressure station's barometer's height with corrected station pressure can resolve the unknown height of a wireless terminal's measurement (assuming no additional pressure measurement errors from the wireless terminal) to the correct handset height above MSL, then it is inconsequential if i) the airport station bias is not correctly known, but the height is correct, or ii) the airport station bias is correct, but the height is not correctly known, as long as the combination of the two after correction creates a reference pressure at a certain elevation that can accurately locate a wireless terminal's height. In other words, even if the location engine has an incorrect barometer height of the airport pressure station, a bias correction can take that into account. Conversely, if the location engine has an incorrect measurement bias for the barometric pressure provided by the airport pressure station, then a corrected height can correct for this when used as a reference.

In order to account for pressure measurement drift, the location engine can adjust the measurement of barometric pressure at the airport pressure station by accounting for more than one estimate of bias, stored as a series. At least some of the estimates of bias in the series can be averaged or otherwise combined in some way, resulting in a value that is used to adjust the subsequent pressure measurements from the pressure station. For example and without limitation, the estimates of bias in the series can be weighted according to their relative ages in the series, prior to being used in the adjustment.

The illustrative embodiment features a pressure station at an airport as the pressure reference that is calibrated and used going forward as the pressure reference in estimating the elevation of a wireless terminal. As those who are skilled in the art will appreciate, after reading this specification, pressure station references other than those at airports can be used, notwithstanding the inability to access them physically to calibrate them directly.

A first illustrative method of estimating elevation of one or more wireless terminals, the method comprising: receiving, by a data processing system, a first series of measurements of barometric pressure at a first pressure reference, wherein the first pressure reference is at a first outdoor location and at an unknown height above a reference level, the unknown height being unknown to the data processing system; receiving, by the data processing system, a second series of measurements of barometric pressure at a second pressure reference, wherein the second pressure reference is at a second outdoor location and at a first known height above the reference level, the first known height being known to the data processing system; generating, by the data processing system, a first estimate of the bias of barometric pressure measured by the first pressure reference based on: (i) the first series of measurements of barometric pressure at the first pressure reference, (ii) the second series of measurements of barometric pressure at the second pressure reference, and (iii) the first known height of the second pressure reference; receiving, by the data processing system, a first measurement of barometric pressure at a first wireless terminal; receiving, by the data processing system, a subsequent measurement of barometric pressure at the first pressure reference, wherein the subsequent measurement of barometric pressure is received after the first series of measurements is received; generating, by the data processing system, an estimate of the elevation of the first wireless terminal based on: (i) the first measurement of barometric pressure at the first wireless terminal, (ii) the subsequent measurement of barometric pressure at the first pressure reference, and (iii) the first estimate of bias.

A second illustrative method of estimating elevation of one or more wireless terminals, the method comprising: receiving, by a data processing system, a first series of measurements of barometric pressure at a first pressure reference, wherein the first pressure reference is at a first outdoor location and on a first premises; receiving, by the data processing system, a second series of measurements of barometric pressure at a second pressure reference, wherein the second pressure reference is at a second outdoor location, off the first premises, and at a first known height above the reference level, the first known height being known to the data processing system; generating, by the data processing system, a first estimate of the bias of barometric pressure measured by the first pressure reference based on: (i) the first series of measurements of barometric pressure at the first pressure reference, (ii) the second series of measurements of barometric pressure at the second pressure reference, and (iii) the first known height of the second pressure reference; receiving, by the data processing system, a first measurement of barometric pressure at a first wireless terminal; receiving, by the data processing system, a subsequent measurement of barometric pressure at the first pressure reference, wherein the subsequent measurement of barometric pressure is received after the first series of measurements is received; generating, by the data processing system, an estimate of the elevation of the first wireless terminal based on: (i) the first measurement of barometric pressure at the first wireless terminal, (ii) the subsequent measurement of barometric pressure at the first pressure reference, and (iii) the first estimate of bias.

A third illustrative method of estimating elevation of one or more wireless terminals, the method comprising: receiving, by a data processing system, a first series of measurements of barometric pressure at a first pressure reference, wherein the first pressure reference is at a first outdoor location and between a first known height and a second known height above a reference level; receiving, by the data processing system, a second series of measurements of barometric pressure at a second pressure reference, wherein the second pressure reference is at a second outdoor location and at the first known height above the reference level; receiving, by the data processing system, a third series of measurements of barometric pressure at a third pressure reference, wherein the third pressure reference is at a third outdoor location and at the second known height above the reference level; generating, by the data processing system, a first estimate of the bias of barometric pressure measured by the first pressure reference based on: (i) the first series of measurements of barometric pressure at the first pressure reference, (ii) the second series of measurements of barometric pressure at the second pressure reference, (iii) the third series of measurements of barometric pressure at the third pressure reference, (iv) the first known height of the second pressure reference, and (v) the second known height of the third pressure reference; receiving, by the data processing system, a first measurement of barometric pressure at a first wireless terminal; receiving, by the data processing system, a subsequent measurement of barometric pressure at the first pressure reference, wherein the subsequent measurement of barometric pressure is received after the first series of measurements is received; generating, by the data processing system, an estimate of the elevation of the first wireless terminal based on: (i) the first measurement of barometric pressure at the first wireless terminal, (ii) the subsequent measurement of barometric pressure at the first pressure reference, and (iii) the first estimate of bias.

DEFINITIONS

Figure 1:
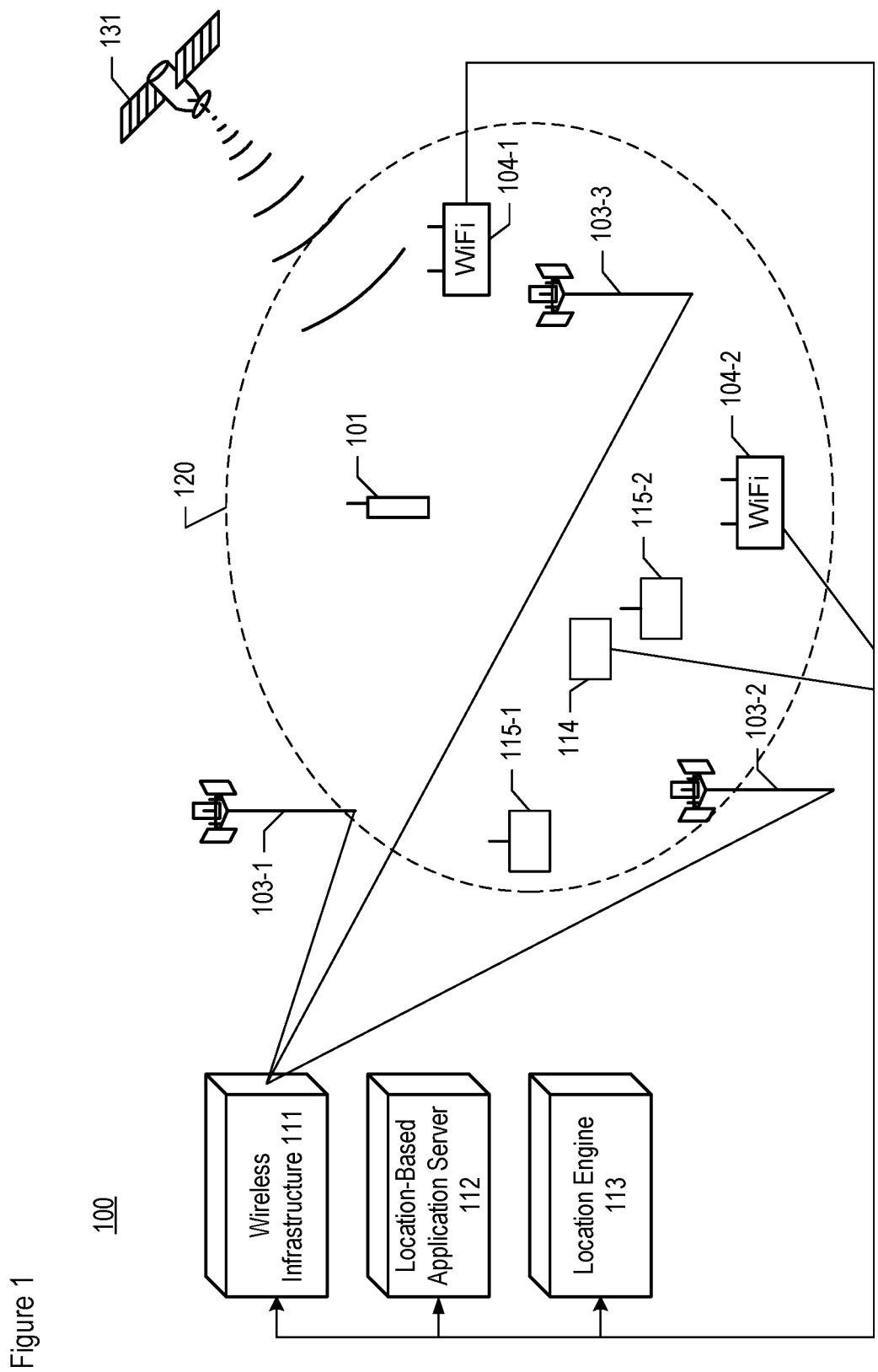
FIG. 1 depicts a diagram of the salient components of telecommunications system 100 in accordance with the illustrative embodiment of the present invention.

Barometric Pressure—For the purposes of this specification, the term "barometric pressure" is defined as a pressure measured by a barometer. This pressure relates to atmospheric pressure, which is the force per unit area exerted on a surface by the weight of the air above that surface in the atmosphere of Earth.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Elevation—For the purposes of this specification, the term "elevation" is defined as the height relative to a reference (e.g., mean sea level, ground level, etc.).

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Height—For the purposes of this specification, the term "height" should be given the ordinary and customary meaning that the term would have to a person of ordinary skill in the art at the time of the invention.

Identity of a Radio Signal—For the purposes of this specification, the phrase "identity of a radio signal" is defined as one or more indicia that distinguish one radio signal from another radio signal.

Lateral Location—For the purposes of this specification, a "lateral location" is defined as information that is probative of latitude or longitude or latitude and longitude.

Location—For the purposes of this specification, the term "location" is defined as a zero-dimensional point, a finite one-dimensional path segment, a finite two-dimensional surface area, or a finite three-dimensional volume.

Outdoor Location—For the purposes of this specification, the term "outdoor location" is defined as a location at which outdoor atmospheric pressure is able to be measured without impediment.

Premises—For the purposes of this specification, a "premises" is defined a house or building, together with its land and outbuildings, occupied by a business or considered in an official context.

Processor—For the purposes of this specification, a "processor" is defined as hardware or hardware and software that performs mathematical and/or logical operations.

Radio—For the purposes of this specification, a "radio" is defined as hardware or hardware and software that is capable of telecommunications via an unguided (i.e., wireless) radio signal of frequency less than 600 GHz.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless Terminal—For the purposes of this specification, the term "wireless terminal" is defined as a device that is capable of telecommunications without a wire or tangible medium. A wireless terminal can be mobile or immobile. A wireless terminal can transmit or receive or transmit and receive. As is well known to those skilled in the art, a wireless terminal is also commonly called a cell phone, a pager, a wireless transmit/receive unit (WTRU), a user equipment (UE), a mobile station, wireless handset, a fixed or mobile subscriber unit, a pager, a cellular telephone, a personal digital assistant (PDA), an Internet of Things (IoT) device, a computer, and any other type of device capable of operating in a wireless environment are examples of wireless terminals.

DETAILED DESCRIPTION

Telecommunications System 100—

FIG. 1 depicts a diagram of the salient components of telecommunications system 100 in accordance with the illustrative embodiment of the present invention. Telecommunications system 100 comprises: wireless terminal 101, cellular base stations 103-1, 103-2, and 103-3, Wi-Fi base stations 104-1 and 104-2, wireless infrastructure 111, location-based application server 112, location engine 113, airport pressure station 114, pre-calibrated pressure stations 115-1 and 115-2, and a Global Navigation Satellite System (GNSS) that includes Global Positioning System (GPS) constellation 131, interrelated as shown.

Wireless infrastructure 111, location-based application server 112, location engine 113, and Wi-Fi base stations 104-1 and 104-2 are all connected to one or more interconnected computer networks (e.g., the Internet, a local-area network, a wide-area network, etc.) and, as such, can exchange data in well-known fashion.

Wireless terminal 101 is a device that provides bi-directional voice, data, and video telecommunications services to its user (not shown). Terminal 101 also performs the processes described below and in the accompanying figures, including measuring temperature and barometric pressure, and providing temperature and pressure measurements. Terminal 101 comprises the hardware and software necessary to do the aforementioned tasks. Furthermore, wireless terminal 101 is mobile and can be at any location within geographic region 120 at any time.

Wireless terminal 101 provides the aforementioned telecommunications services to their respective users and perform the aforementioned tasks. It will, however, be clear to those skilled in the art, after reading this disclosure, how to make and use embodiments of the present invention in which wireless terminal 101 provides a different set of services or perform a different set of tasks.

In accordance with the illustrative embodiment, in order to support location estimation, wireless terminal 101 can receive one or more radio signals from each of base stations 103-1, 103-2, and 103-3, Wi-Fi base stations 104-1 and 104-2, and GPS constellation 131, in well-known fashion. Wireless terminal 101 is also capable of identifying each radio signal it receives, in well-known fashion, and of transmitting the identity of each signal it receives to location engine 113. The wireless terminals are further capable of measuring one or more location-dependent traits (e.g., amplitude, phase, etc.) of each radio signal they receive, in well-known fashion, and of transmitting each measurement they generate to location engine 113. As those who are skilled in the art will appreciate after reading this specification, wireless terminal 101 can use and/or support one or more technologies other than WiFi and GPS for estimating the location of the wireless terminal.

In accordance with the illustrative embodiment, wireless terminal 101 can transmit one or more radio signals—that can be received by one or more of base stations 103-1, 103-2, and 103-3 and Wi-Fi base stations 104-1 and 104-2—in accordance with specific parameters (e.g., MAC address, signal strength, frequency, coding, modulation, band, etc.), in well-known fashion, and of transmitting those parameters to location engine 113.

In accordance with the illustrative embodiment, and as described in detail below, wireless terminal 101 comprises a barometer (shown in FIG. 2 as barometer 205). Accordingly, wireless terminal 101 is capable of measuring (e.g., periodically, sporadically, and on-demand) the temperature and barometric pressure, in well-known fashion, and of transmitting the measurements to location engine 113.

Although the illustrative embodiment depicts telecommunications system 100 as comprising one wireless terminal, it will be clear to those skilled in the art, after reading this disclosure, how to make and use alternative embodiments of the present invention that comprise any number of wireless terminals.

Cellular base stations 103-1, 103-2, and 103-3 communicate with wireless infrastructure 111 via wireline or wireless backhaul and with wireless terminal 101 via radio in well-known fashion. As is well known to those skilled in the art, base stations are also commonly referred to by a variety of alternative names such as access points, nodes, network interfaces, etc. Although the illustrative embodiment comprises three cellular base stations, it will be clear to those skilled in the art, after reading this disclosure, how to make and use alternative embodiments of the present invention that comprise any number of cellular base stations.

In accordance with the illustrative embodiment of the present invention, cellular base stations 103-1, 103-2, and 103-3 are terrestrial and immobile, and base station 103-3 is situated within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 103-1, 103-2, and 103-3 comprise the hardware and software necessary to be Long-Term Evolution (LTE) 3GPP-compliant and perform the processes described below and in the accompanying figures. In some alternative embodiments of the present invention, base stations 103-1, 103-2, and 103-3 communicate in accordance with a different cellular standard. Each of cellular base stations 103-1, 103-2, and 103-3 are capable of continually, for example and without limitation:

a. receiving one or more radio signals transmitted by wireless terminal 101, and
b. identifying each radio signal transmitted by wireless terminal 101, in well-known fashion, and of transmitting the identity of those signals to location engine 113, and
c. measuring one or more location-dependent traits of each radio signal transmitted by wireless terminal 101, in well-known fashion, and of transmitting the measurements to location engine 113, and
d. transmitting one or more signals to wireless terminal 101 in accordance with specific parameters (e.g., signal strength, frequency, coding, modulation, etc.), in well-known fashion, and of transmitting those parameters to location engine 113, and
e. broadcasting one or more signals that wireless terminals can use for various purposes (e.g., mobile assisted handoff, location determination, etc.).

It will be clear to those skilled in the art how to make and use cellular base stations 103-1, 103-2, and 103-3.

Wi-Fi base stations 104-1 and 104-2 communicate with wireless terminal 101 via radio in well-known fashion and in accordance with a WiFi protocol. In some alternative embodiments of the present invention, base stations 104-1 and 104-2 communicate in accordance with a different IEEE 802.11 standard or wireless LAN standard entirely. Wi-Fi base stations 104-1 and 104-2 are terrestrial, immobile, and within geographic region 120. Although the illustrative embodiment comprises two Wi-Fi base stations, it will be clear to those skilled in the art, after reading this disclosure, how to make and use alternative embodiments of the present invention that comprise any number of Wi-Fi base stations.

Each of Wi-Fi base stations 104-1 and 104-2 are capable of continually:

a. receiving one or more radio signals transmitted by wireless terminal 101, and
b. identifying each radio signal transmitted by wireless terminal 101, in well-known fashion, and of transmitting the identity of those signals to location engine 113, and
c. measuring one or more location-dependent traits of each radio signal transmitted by wireless terminal 101, in well-known fashion, and of transmitting the measurements to location engine 113, and
d. transmitting one or more signals to wireless terminal 101 in accordance with specific parameters (e.g., signal strength, frequency, coding, modulation, etc.), in well-known fashion, and of transmitting those parameters to location engine 113, and
e. broadcasting one or more signals that wireless terminals can use for various purposes (e.g., mobile assisted handoff, location determination, etc.).

It will be clear to those skilled in the art how to make and use Wi-Fi base stations 104-1 and 104-2.

Wireless infrastructure 111 comprises a switch that orchestrates the provisioning of telecommunications service to wireless terminal 101 and the flow of information to and from location engine 113, as described below and in the accompanying figures. As is well known to those skilled in the art, wireless switches are also commonly referred to by other names such as mobile switching centers, mobile telephone switching offices, routers, and so on.

Location-based application server 112 comprises hardware and software that uses the estimate of the location of wireless terminal 101—generated by location engine 113—in a location-based application, in well-known fashion. Location-based applications are well-known in the art and provide services such as without limitation E-911 routing, navigation, location-based advertising, weather alerts. In accordance with the illustrative embodiment, location-based application server 112 is implemented on a data-processing system made up of one or more server computers.

Location engine 113 is a data processing system that comprises hardware and software that generates one or more estimates of the locations of wireless terminal 101 as described below and in the accompanying figures. Location engine 113 maintains one or more databases (e.g., pressure reference database, geographic information system [GIS] database, etc.) which are described in detail below. In accordance with the illustrative embodiment, location engine 113 is implemented on a data-processing system made up of one or more server computers. It will be clear to those skilled in the art, after reading this disclosure, how to make and use location engine 113.

Figure 3:
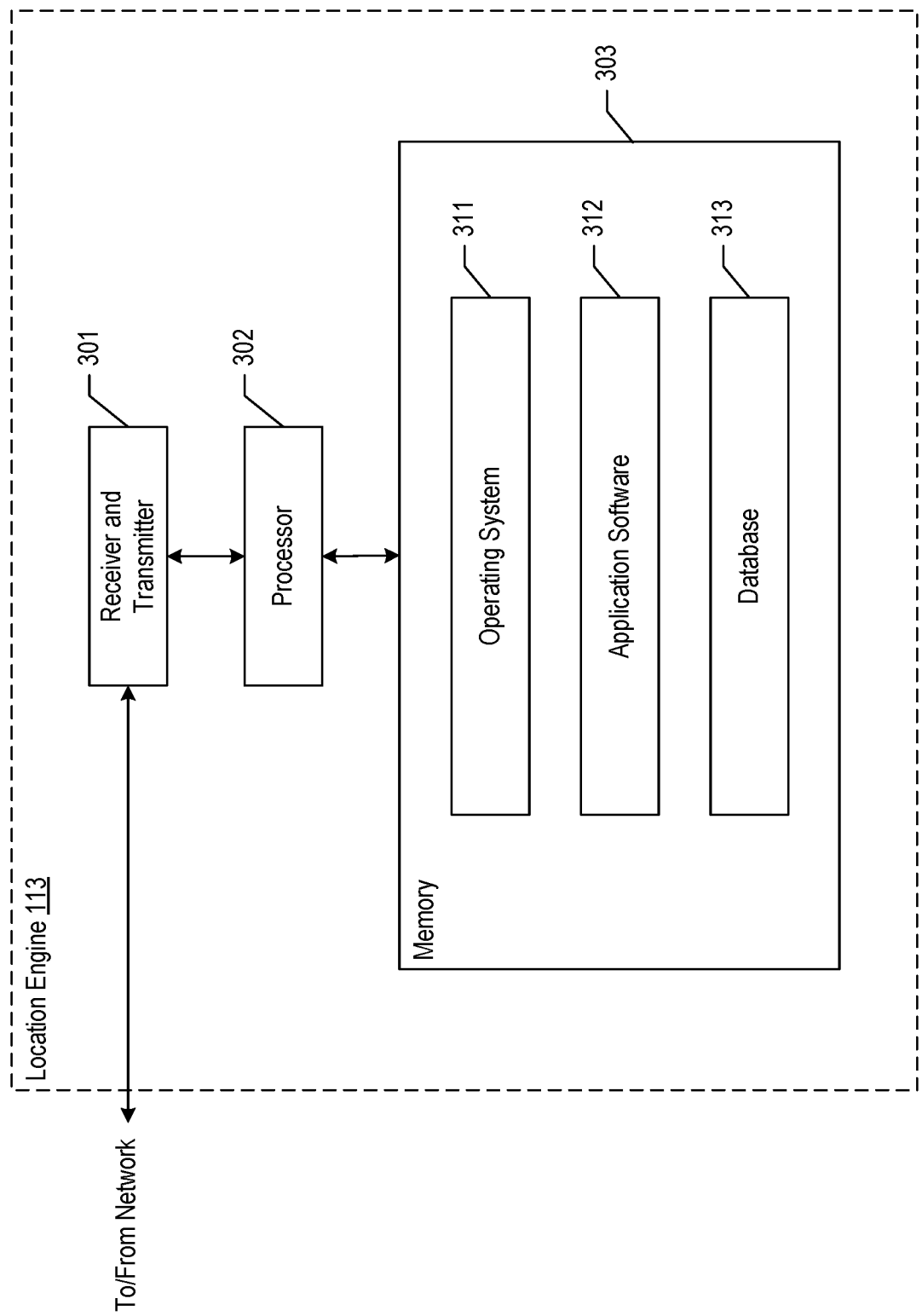
FIG. 3 depicts a block diagram of the salient components of location engine 113 of telecommunications system 100.

Location engine 113 is depicted in FIG. 3 as physically distinct from wireless infrastructure 111. However, it will be clear to those skilled in the art, after reading this disclosure, how to make and use alternative embodiments of the present invention in which location engine 113 is wholly or partially integrated into wireless infrastructure 111.

Airport pressure station 114, which is a first pressure reference, comprises hardware and software that continually measures the outdoor temperature (i.e., provides a measurement of temperature representative of an outdoor location) and measures the atmospheric pressure (i.e., provides a measurement of barometric pressure representative of an outdoor location), in well-known fashion, and transmits those measurements to a central location that is accessible by location engine 113 (e.g., a National Weather Service database, etc.). In measuring temperature and barometric pressure at an outdoor location, airport pressure station 114 is not subject to any stack effect. Station 114 is at a known lateral location in geographic region 120, but is at an unknown elevation—that is, unknown to location engine 113.

In some embodiments of the present invention, airport pressure station 114 provides measurements of temperature and/or barometric pressure representative of a known outdoor location by taking the measurements at a well-ventilated indoor location (e.g., a ventilated shelter, etc.), or by taking pressure measurements at an indoor location at which the pressure is equal to the outdoor pressure at the same elevation.

In measuring barometric pressure, airport pressure station 114 is characterized as having a measurement bias. At least initially, the correct measurement bias of barometric pressure is unknown to location engine 113, and, as such, airport pressure station 114 is considered to be initially uncalibrated.

In accordance with the illustrative embodiment, airport pressure station 114 is situated at an airport (i.e., is on the airport's premises) and serves the airport. In some embodiments of the present invention, station 114 is at a weather-reporting station, while in other embodiments station 114 is at a different type of station (i.e., neither at an airport nor reporting the weather). Although the illustrative embodiment comprises only one airport pressure station, it will be clear to those skilled in the art how to make and use alternative embodiments of the present invention that comprise any number of airport pressure stations.

Pre-calibrated pressure stations 115-1 and 115-2, which are second and third pressure references, each comprises hardware and software that continually measures the outdoor temperature (i.e., provides a measurement of temperature representative of an outdoor location) and measures the atmospheric pressure (i.e., provides a measurement of barometric pressure representative of an outdoor location), in well-known fashion, and transmits those measurements to location engine 113 or to a central location that is accessible by location engine 113. In measuring temperature and barometric pressure at an outdoor location, pre-calibrated pressure stations 115-1 and 115-2 are not subject to any stack effect. Stations 115-1 and 115-2 are at known lateral locations within geographic region 120 and at known heights above a reference level (e.g., mean sea level, etc.)—that is, known to location engine 113.

In measuring barometric pressure, each of pressure stations 115-1 and 115-2 can have an associated measurement bias. However, the measurement bias of barometric pressure in these pressure stations have been determined. As such, pressure stations 115-1 and 115-2 are considered to be already calibrated—that is, they are "pre-calibrated." In some embodiments of the present invention, one or both of stations 115-1 and 115-2 comprise class A sensors, of weather station grade that is calibrated to a primary standard. In some other embodiments of the present invention, wireless terminal 101 can serve as one of pre-calibrated pressure stations 115-1 and 115-2 after it has been calibrated, in which its bias of barometric pressure measurement has been determined and accounted for.

The illustrative embodiment depicts telecommunications system 100 as comprising one airport pressure station and two pre-calibrated pressure stations. However, it will be clear to those skilled in the art, after reading this disclosure, how to make and use alternative embodiments of the present invention that comprise any number of airport pressure stations and pre-calibrated pressure stations.

Wireless Terminal 101—

Figure 2:
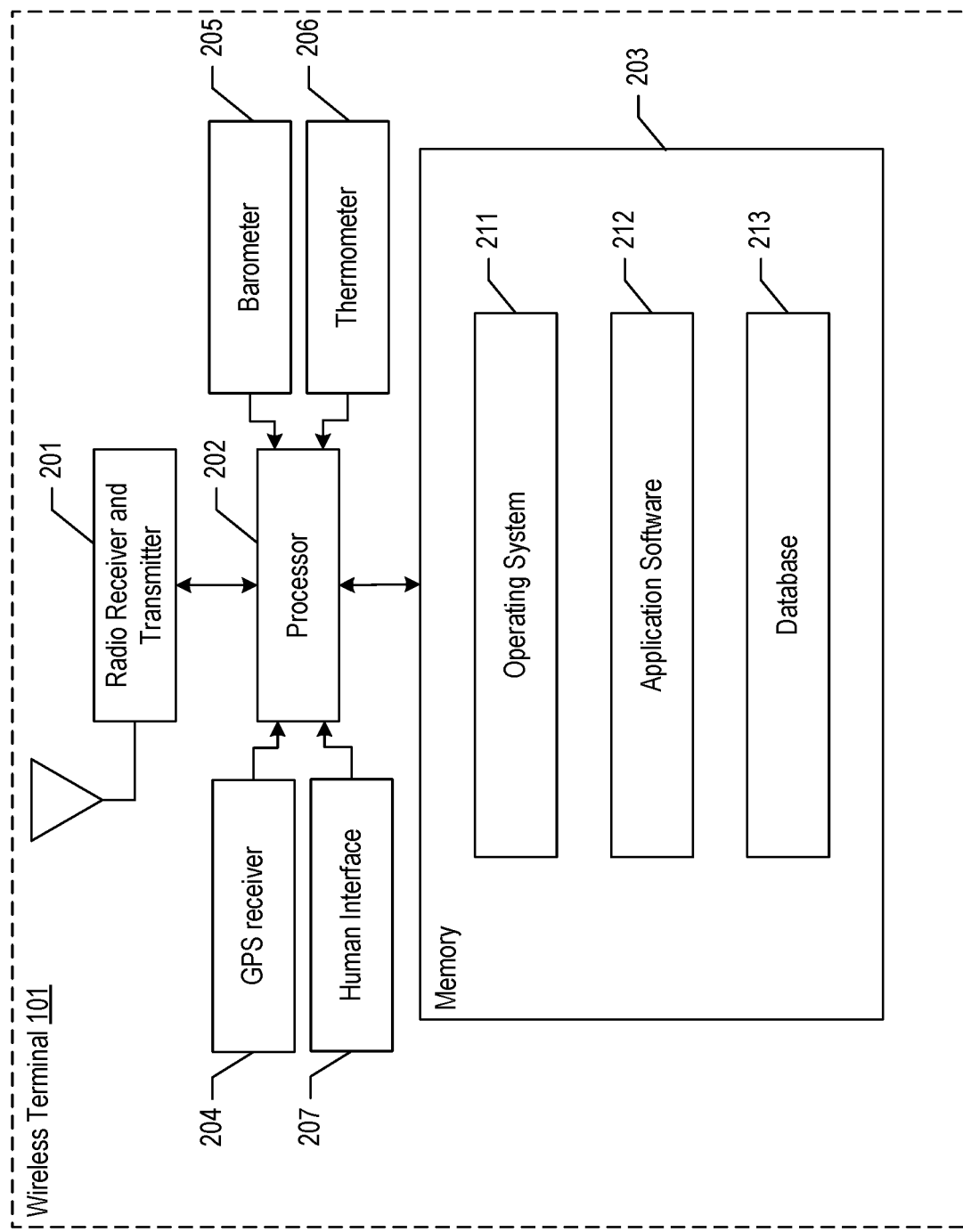
FIG. 2 depicts a block diagram of the salient components of wireless terminal 101 of telecommunications system 100.

FIG. 2 depicts a block diagram of the salient components of wireless terminal 101 in accordance with the illustrative embodiment of the present invention. Wireless terminal 101 comprises: radio receiver and transmitter 201, processor 202, memory 203, GPS receiver 204, barometer 205, and human interface 207, interconnected as shown. The block diagram depicted in FIG. 2 can also be considered representative of other wireless terminals.

Radio receiver and transmitter component 201 comprises hardware and software that enables wireless terminal 101 to receive (and analyze) radio signals and to transmit radio signals. In accordance with the illustrative embodiment, wireless telecommunications service is provided to wireless terminal 101 in accordance with both the Long-Term Evolution (LTE) 4G air-interface standard of the $3^{rd}$ Generation Partnership Project ("3GPP") and the WiFi standard. After reading this disclosure, however, it will be clear to those skilled in the art how to make and use alternative embodiments of the present invention that operate in accordance with one or more other air-interface standards (e.g., a 5G or other standard under development, a different 4G standard, Global System Mobile "GSM," UMTS, CDMA-2000, IS-136 TDMA, IS-95 CDMA, 3G Wideband CDMA, other IEEE 802.11 or wireless LAN standard, 802.16 WiMax, Bluetooth, etc.) in one or more frequency bands. It will be clear to those skilled in the art how to make and use radio receiver and transmitter 201.

Processor 202 is hardware under the command of software stored in memory 203 that performs all of the relevant functions described below and in the accompanying figures. It will be clear to those skilled in the art how to make and use processor 202.

Memory 203 is a non-transitory, non-volatile random-access memory that holds all of the programming and data required for the operation of wireless terminal 101, and includes operating system 211, application software 212, and database 213. It will be clear to those skilled in the art how to make and use memory 203.

GPS receiver 204 is hardware and software that enables wireless terminal 101 to determine its own location. GPS receiver 204 interacts with GPS satellites in constellation 131. It will be clear to those skilled in the art how to make and use GPS receiver 204.

Barometer 205 is a barometric sensor device and typically comprises a hardware MEMS sensor that measures the atmospheric pressure at wireless terminal 101, thereby providing barometric pressure measurements. In accordance with the illustrative embodiment, barometer 205 comprises the LSP331AP MEMS pressure sensor from ST Microelectronics and/or the Bosch BMP280 sensor, but it will be clear those skilled in the art, after reading this disclosure, how to make and use alternative embodiments of the present invention that use a different sensor to measure the atmospheric pressure.

Thermometer 206 is a hardware temperature sensor that measures the ambient temperature at wireless terminal 101. In accordance with the illustrative embodiment, thermometer 206 comprises the Bosch BMP280 sensor, which also measures temperature in addition to pressure, but it will be clear to those skilled in the art, after reading this disclosure, how to make and use alternative embodiments of the present invention that use a different sensor to measure the ambient temperature at wireless terminal 101. For example, the ADT7420 temperature sensor from Analog Devices is capable of measuring temperature. In some embodiments of the present invention, wireless terminal 101 has no thermometer, in which case the system disclosed herein can determine indoor temperature through other means as described below.

Human interface 207 is hardware and software that enables a person to interact with wireless terminal 101. Human interface 207 comprises a display, keypad, microphone, and speaker. It will be clear to those skilled in the art how to make and use human interface 207.

Wireless terminal 101 can perform at least some of the processes described below and in the accompanying figures. For example and without limitation, wireless terminal 101 is capable of:

a. receiving one or more radio signals transmitted by cellular base stations 103-1, 103-2, and 103-3, Wi-Fi base stations 104-1 and 104-2, and GPS constellation 131, and b. identifying each radio signal transmitted by cellular base stations 103-1, 103-2, and 103-3, Wi-Fi base stations 104-1 and 104-2, and GPS constellation 131, in well-known fashion, and transmitting the identity of those signals, or information related to the identity of those signals, to location engine 113, and c. measuring one or more location-dependent traits of each radio signal transmitted by cellular base stations 103-1, 103-2, and 103-3, Wi-Fi base stations 104-1 and 104-2, and GPS constellation 131, in well-known fashion, and of transmitting the measurements to location engine 113, and d. transmitting one or more signals to cellular base stations 103-1, 103-2, and 103-3, Wi-Fi base stations 104-1 and 104-2 in accordance with specific parameters (e.g., signal strength, frequency, coding, modulation, etc.), in well-known fashion, and of transmitting those parameters to location engine 113, and e. measuring the temperature and barometric pressure at wireless terminal 101, in well-known fashion, and transmitting those measurements to location engine 113. In some embodiments of the present invention, wireless terminal can measure the temperature at wireless terminal 101, in well-known fashion, and transmit those measurements to location engine 113.

It will be clear to those skilled in the art how to make and use wireless terminal 101.

Location Engine 113—

FIG. 3 depicts a block diagram of the salient components of location engine 113 in accordance with the illustrative embodiment. Location engine 113 comprises: receiver and transmitter 301, processor 302, and memory 303, which are interconnected as shown.

Receiver and transmitter component 301 enables location engine 113 to transmit to and receive from wireless terminal 101, wireless infrastructure 111, location—based application server 112, airport pressure station 114, and pre-calibrated pressure stations 115-1 and 115-2, in well-known fashion. It will be clear to those skilled in the art how to make and use receiver and transmitter 301.

Processor 302 is a general-purpose processor that can execute an operating system, the application software that performs operations 501 through 515 (described herein and shown in FIG. 5), and of populating, amending, using, and managing a barometric pressure reference database and a GIS database, as described in detail below and in the accompanying figures. It will be clear to those skilled in the art how to make and use processor 302.

In general, the barometric pressure reference database, or "pressure reference database," contains information for one or more pressure references, including airport pressure station 114 and pre-calibrated pressure stations 115-1 and 115-2. The GIS database contains information for geographic region 120, including without limitation, the physical characteristics of all of the structures in geographic region 120. It will be clear to those skilled in the art, after reading this specification, how to make and use the pressure reference database and GIS database.

Memory 303 is a non-transitory, non-volatile memory that stores:

a. operating system 311, and
b. application software 312, and
c. the pressure reference database in database 313, and
d. the GIS database in database 313.

In some embodiments of the present invention, memory 303 is in the form of cloud storage or network storage. In any event, it will be clear to those skilled in the art how to make and use memory 303.

Pre-Calibrated Pressure Station 115-1—

Figure 4:
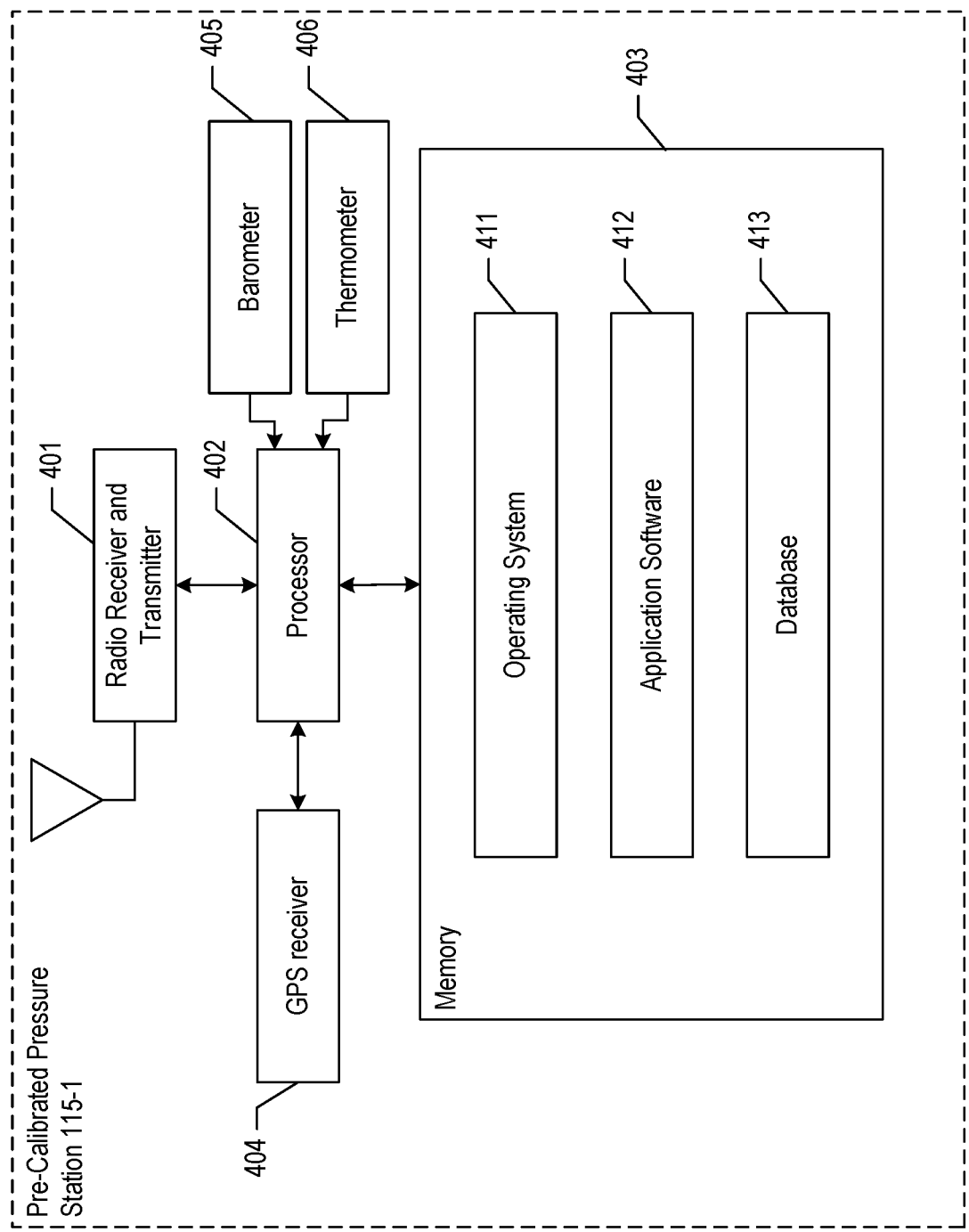
FIG. 4 depicts a block diagram of the salient components of pre-calibrated pressure station 115-1 of telecommunications system 100.

FIG. 4 depicts a block diagram of the salient components of pre-calibrated pressure station 115-1 in accordance with the illustrative embodiment of the present invention. Pressure station 115-1 comprises: radio receiver and transmitter 401, processor 402, memory 403, GPS receiver 404, and barometer 405, interconnected as shown. The block diagram depicted in FIG. 4 can also be considered representative of other pre-calibrated pressure stations, such as pressure station 115-2.

Radio receiver and transmitter component 401 comprises hardware and software that enables pressure station 115-1 to receive radio signals and to transmit radio signals. It will be clear to those skilled in the art how to make and use radio receiver and transmitter 401.

Processor 402 is hardware under the command of software stored in memory 403 that performs all of the relevant functions described below and in the accompanying figures. It will be clear to those skilled in the art how to make and use processor 402.

Memory 403 is a non-transitory, non-volatile random-access memory that holds all of the programming and data required for the operation of pressure station 115-1, and includes operating system 411, application software 412, and database 413. It will be clear to those skilled in the art how to make and use memory 403.

GPS receiver 404 is hardware and software that enables pressure station 115-1 to determine its own location, including its lateral location within a geographic area and height about a predetermined reference level (e.g., mean sea level, etc.). GPS receiver 404 interacts with GPS satellites in constellation 131. In some embodiments of the present invention, GPS receiver 404 is capable of real-time kinematics (RTK) positioning. It will be clear to those skilled in the art how to make and use GPS receiver 404.

Barometer 405 is a barometric sensor device and typically comprises a pre-calibrated, hardware MEMS sensor that measures the atmospheric pressure at pressure station 115-1, thereby providing barometric pressure measurements. In accordance with the illustrative embodiment, barometer 405 comprises the LSP331AP MEMS pressure sensor from ST Microelectronics and/or the Bosch BMP280 sensor, but it will be clear those skilled in the art, after reading this disclosure, how to make and use alternative embodiments of the present invention that use a different sensor to measure the atmospheric pressure.

Thermometer 406 is a hardware temperature sensor that measures the ambient outdoor temperature at pressure station 115-1. In accordance with the illustrative embodiment, thermometer 406 comprises the Bosch BMP280 sensor, which also measures temperature in addition to pressure, but it will be clear to those skilled in the art, after reading this disclosure, how to make and use alternative embodiments of the present invention that use a different sensor to measure the ambient outdoor temperature at pressure station 115-1. For example, the ADT7420 temperature sensor from Analog Devices is capable of measuring temperature.

It will be clear to those skilled in the art, after reading this specification how to make and use pressure station 115-1.

Operation of the Illustrative Embodiment—

Figure 5:
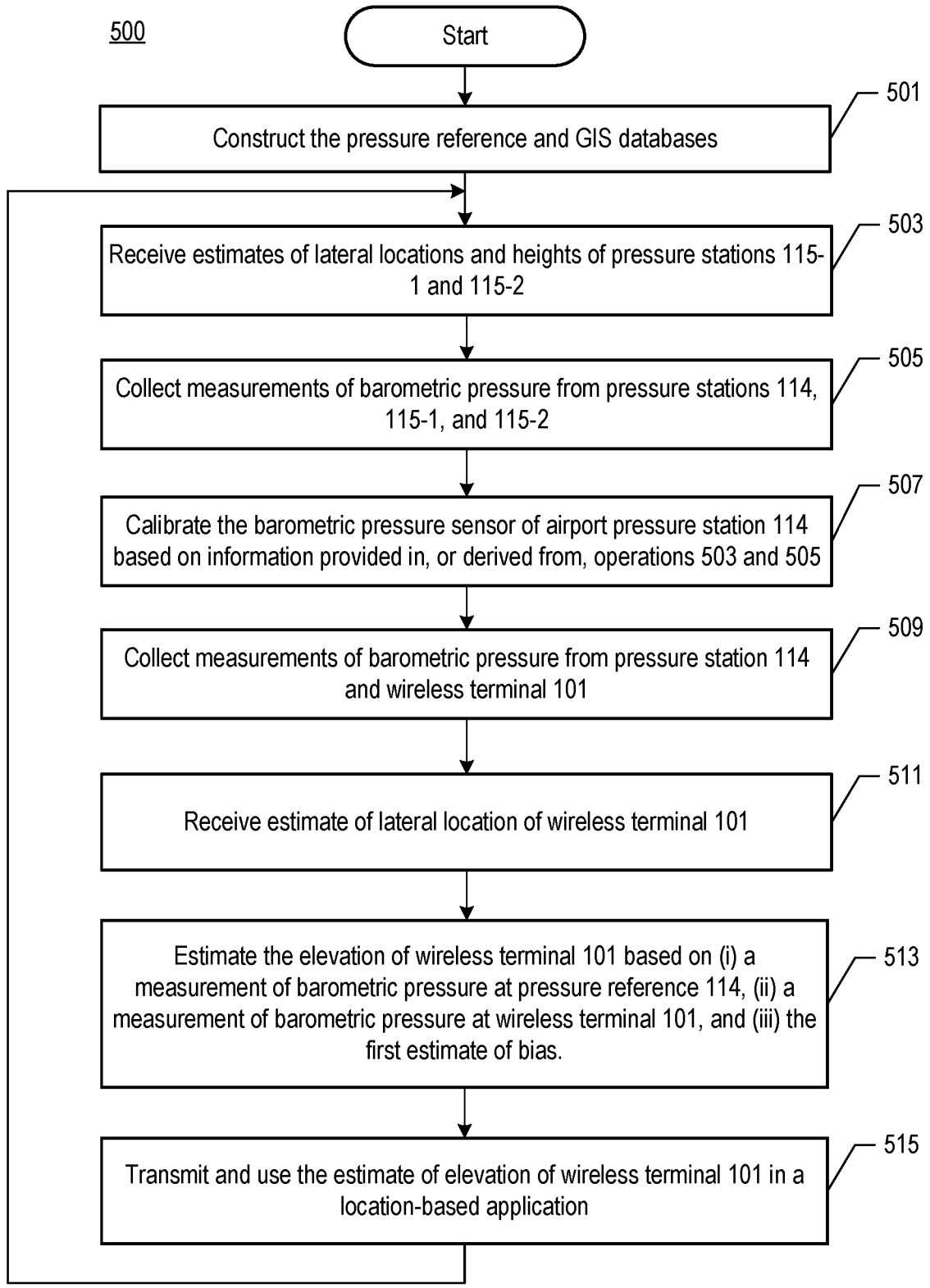
FIG. 5 depicts a flowchart of the salient processes performed as part of method 500 in accordance with the illustrative embodiment of the present invention.

FIG. 5 depicts a flowchart of the salient processes performed as part of method 500 in accordance with the illustrative embodiment of the present invention. It will be clear to those having ordinary skill in the art, after reading the present disclosure, how to make and use alternative embodiments of method 500, as well as the other methods disclosed in this specification, wherein the recited operations sub-operations, and messages are differently sequenced, grouped, or sub-divided—all within the scope of the present disclosure. It will also be clear to those skilled in the art, after reading the present disclosure, how to make and use alternative embodiments of the disclosed methods wherein some of the described operations, sub-operations, and messages are optional, or are omitted.

It will also be clear to those skilled in the art, after reading the present disclosure, how to make and use alternative embodiments of the disclosed methods wherein some of the disclosed operations are performed by other elements and/or systems. For example and without limitation, at least some of the operations disclosed as being performed by location engine 113 can be performed by one or more wireless terminals (e.g., terminal 101, etc.) or by one or more pre-calibrated pressure stations (e.g., stations 115-1, 115-2, etc.). As another example, at least some of the operations disclosed as being performed by pressure stations 115-1 and/or 115-2 can be performed by one or more wireless terminals (e.g., terminal 101, etc.).

In accordance with operation 501, the pressure reference database and GIS database are initialized and stored in memory 303 of location engine 113. Operation 501 is described in detail below and in the accompanying figures.

In accordance with operation 503, location engine 113 receives estimates of the (i) lateral locations and (ii) heights about a predetermined reference level (e.g., mean sea level, etc.), of pre-calibrated pressure stations 115-1 and 115-2. In accordance with the illustrative embodiment, location engine 113 receives the information from stations 115-1 and 115-2 themselves.

In accordance with operation 505, location engine 113 collects measurements of barometric pressure from airport pressure station 114 and pre-calibrated pressure stations 115-1 and 115-2 (i.e., either directly or indirectly). In some embodiments of the present invention, location engine 113 can also collect measurements of temperature. Operation 505 is described in detail below and in the accompanying figures.

In accordance with operation 507, location engine 113 calibrates airport pressure station 114, including generating an estimate of bias of barometric pressure measured at station 114. Operation 507 is described in detail below and in the accompanying figures.

In accordance with operation 509, location engine 113 collects measurements of barometric pressure from airport pressure station 114 (i.e., either directly or indirectly) and from other airport pressure stations as well. In some embodiments of the present invention, location engine 113 can also collect measurements of temperature. Operation 509 is described in detail below and in the accompanying figures.

In accordance with operation 511, location engine 113 receives an estimate of the lateral location of wireless terminal 101, as generated by wireless terminal 101. In some embodiments of the present invention, location engine 113 itself generates an estimate of the lateral location of wireless terminal 101, without or without using the lateral location provided by wireless terminal 101, based on:
  a. the location-dependent information conveyed by a radio signal exchanged between a base station (e.g., cellular base station 103-i, Wi-Fi base station 104-j, etc.) and wireless terminal 101 (e.g., the empirical data for the radio signals received in operation 407, etc.), and
  b. a location-trait database, in well-known fashion.

As those who are skilled in the art will appreciate after reading this specification, in some other alternative embodiments the lateral location can be determined using a different technique than those described above (e.g., WiFi, Bluetooth, OTDOA, etc.). Moreover, as those who are skilled in the art will appreciate after reading this specification, more than one technique can be combined in order to determine the lateral location, in some embodiments of the present invention.

In accordance with operation 513, location engine 113 generates an estimate of the elevation of wireless terminal 101 based on:
  a. the estimate of lateral location of wireless terminal 101 received or generated in accordance with operation 511,
  b. a measurement of barometric pressure at pressure reference 114 obtained in accordance with operation 509,
  c. a measurement of barometric pressure at wireless terminal 101 obtained in accordance with operation 509, and
  d. an estimate of bias obtained in accordance with operation 507.

Operation 513 is described in detail below and in the accompanying figures.

In accordance with operation 515, location engine 113 transmits:
  a. the estimate of the lateral location of wireless terminal 101 generated in accordance with operation 511, and/or
  b. the estimate of the elevation of wireless terminal 101 generated in accordance with operation 513, and/or
  c. the estimate of the elevation of airport pressure station 114 generated in accordance with operation 507, and/or
  d. the estimate of the measurement bias of airport pressure station 114 generated in accordance with operation 507, and/or
  e. any other information used to determine the lateral location, estimate of elevation, and/or measurement bias, to location-based application server 112 and/or to wireless terminal 101 for use in a location-based application and/or to yet another data-processing system (e.g., server computer, wireless terminal, etc.).

In some embodiments of the present invention, location engine 113 displays (e.g., on a display, etc.) information related to the estimate of lateral location and/or estimate of elevation, instead of or in addition to transmitting them. In any event, it will be clear to those skilled in the art how to make and use embodiments of the present invention that perform operation 515.

After operation 515 is completed, control passes back to operation 503.

Operation 501: Construct the Pressure Reference Database and GIS Database—

Figure 6:
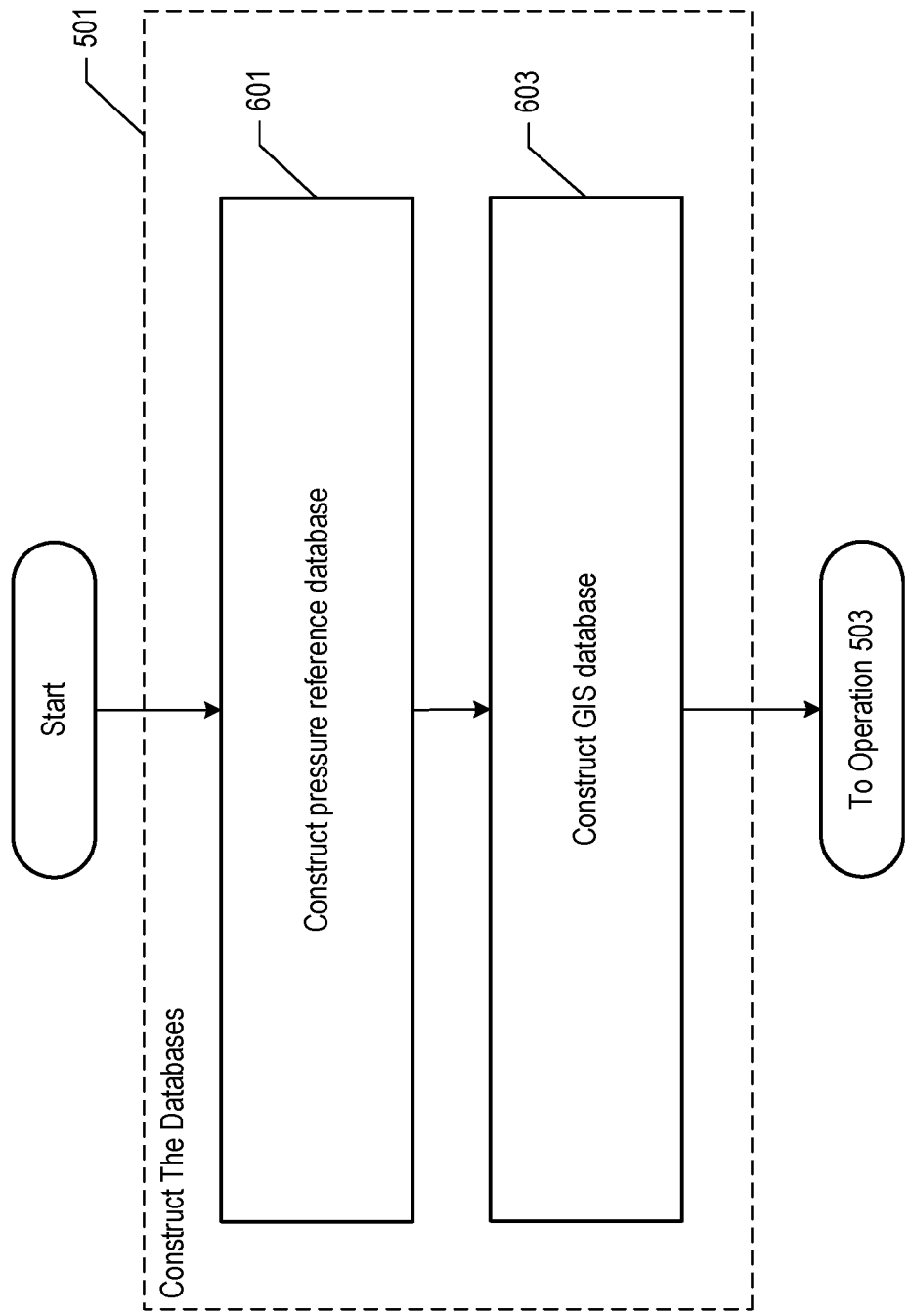
FIG. 6 depicts a flowchart of the salient processes performed in accordance with operation 501 of method 500.

FIG. 6 depicts a flowchart of the salient processes performed in accordance with operation 501.

Figure 7A:
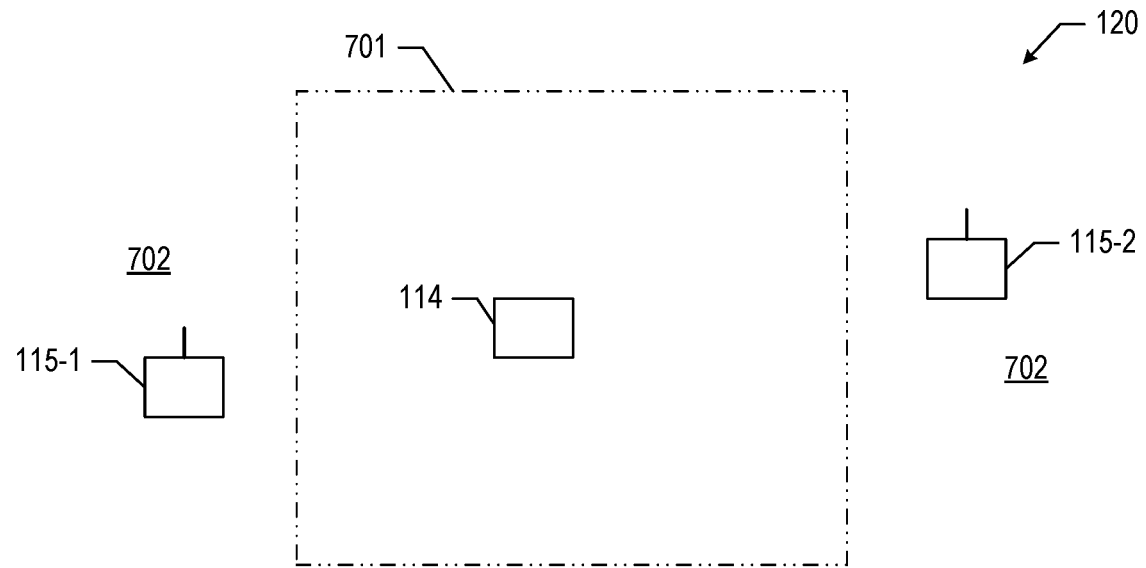
FIGS. 7A and 7B depict maps of lateral locations and heights, respectively, of various pressure stations.

At operation 601, the barometric pressure reference database is constructed and stored in memory 303 of location engine 113. As part of operation 601, a detailed map is made of the lateral locations of airport pressure station 114 and pre-calibrated pressure stations 115-1 and 115-2, as shown in FIG. 7A. Additionally, a detailed map is made of the heights of pre-calibrated pressure stations 115-1 and 115-2 above predetermined reference level 711 (e.g., above mean sea level, etc.), as shown in FIG. 7B.

FIG. 7A depicts on-premises region 701 defined by an airport property boundary and off-premises region 702 (i.e., outside of region 701). Airport pressure station 114 is situated in building 713 within on-premises region 701, wherein building 713 is inaccessible to third party users of the pressure data provided by station 114. For illustrative purposes, pre-calibrated pressure stations 115-1 and 115-2 are in off-premises region 702, although in some embodiments of the present invention one or both of stations 115-1 and 115-2 can be on the airport premises. Ground level 712 can vary, both within the airport property and outside of the airport boundary. Consequently, pressure stations 115-1 and 115-2 might be at different heights above MSL.

In some embodiments of the present invention, stations 114 and 115-1 are as laterally close as possible to each other (e.g., within one kilometer of each other, etc.). In some embodiments of the present invention, stations 115-1 and 115-2 are on opposite sides of region 701 in order to account for microclimates or other localized conditions. In some cases, being on opposite sides of region 701 means that that an imaginary straight line between stations 115-1 and 115-2 passes through region 701 and. In some cases, this means that the imaginary straight line passes within a predetermined distance of station 114.

Figure 7B:
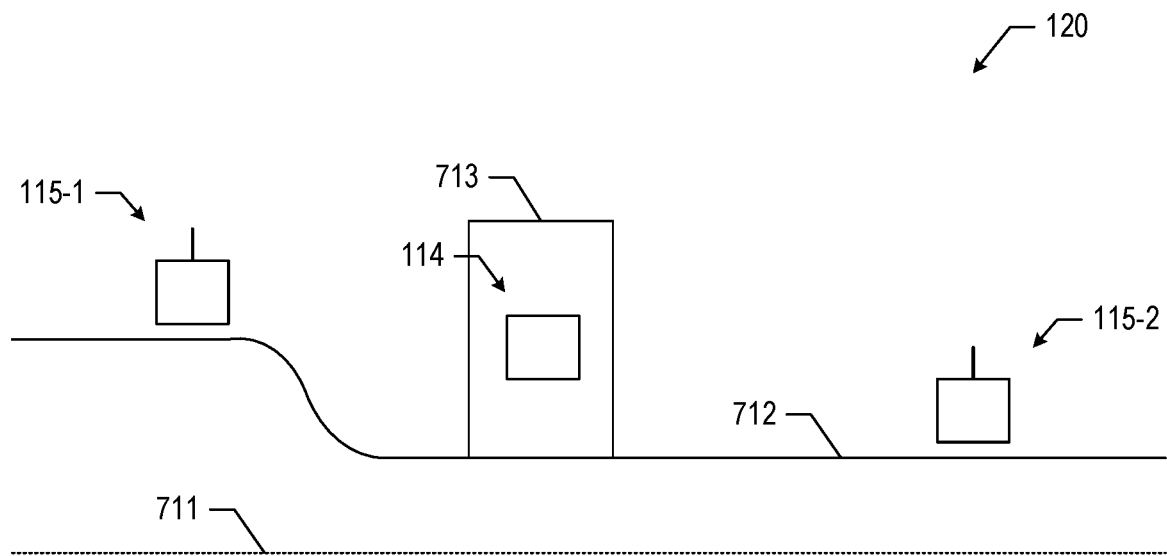

In accordance with the illustrative embodiment, a detailed map is made of the heights of pre-calibrated pressure stations 115-1 and 115-2 above predetermined reference level 711 (e.g., above mean sea level, etc.), as shown in FIG. 7B, based on the GPS RTK readings from stations 115-1 and 115-2, respectively. In some embodiments of the present invention, the RTK GPS readings can be replaced by, or augmented with, the combination of i) the known height above ground level of each station 115-1 and 115-2 (e.g., one meter, etc.) and ii) the USGS or surveyed elevation of the ground level (e.g., at each station, at the runway, etc.).

At operation 603, the GIS database is constructed and stored in memory 303 of location engine 113. As part of operation 603, geographic region 120 is delimited and surveyed. The GIS database represents the geographic region within which wireless terminal might be present and whose location can be estimated.

In accordance with the illustrative embodiment, geographic region 120 comprises approximately four city blocks of an urban environment, on-premises region 701, and at least some of off-premises region 702 (i.e., outside of region 701). It will be clear to those skilled in the art however, after reading this disclosure, how to make and use alternative embodiments of the present invention in which geographic region 120 has any area of any shape and any population density and development.

Figure 8:
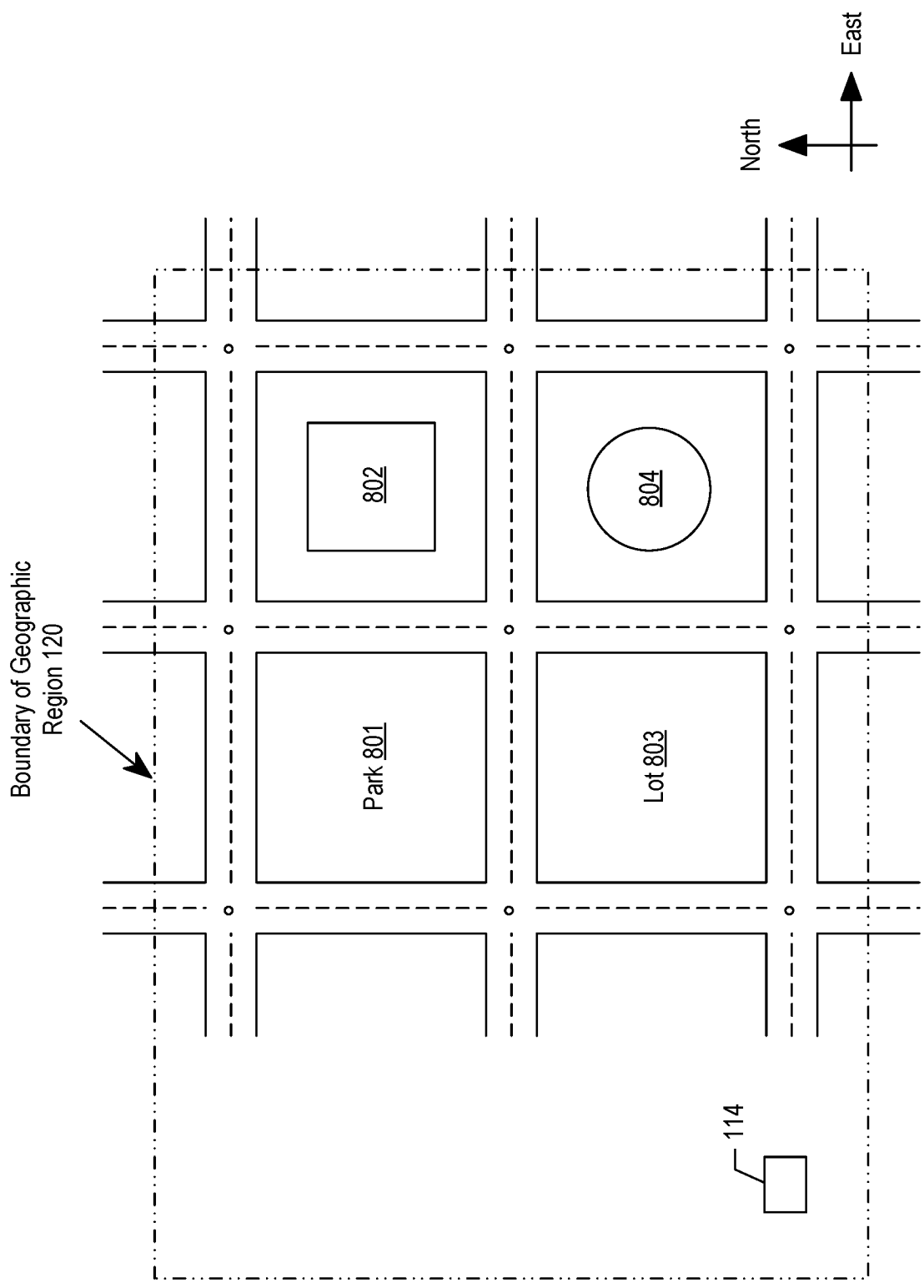
FIG. 8 depicts a map of the ground level of geographic region 120.

As part of operation 603, a detailed map of the ground level of geographic region 120 is made in well-known fashion, and as shown in FIG. 8. The elements within region 120 as depicted as not necessarily drawn to scale geographically. For example, airport pressure station 114 is depicted as being relatively close to the cluster of buildings in order to both fit all of the described elements within the same figure and provide sufficient detail for each element.

Figure 9:
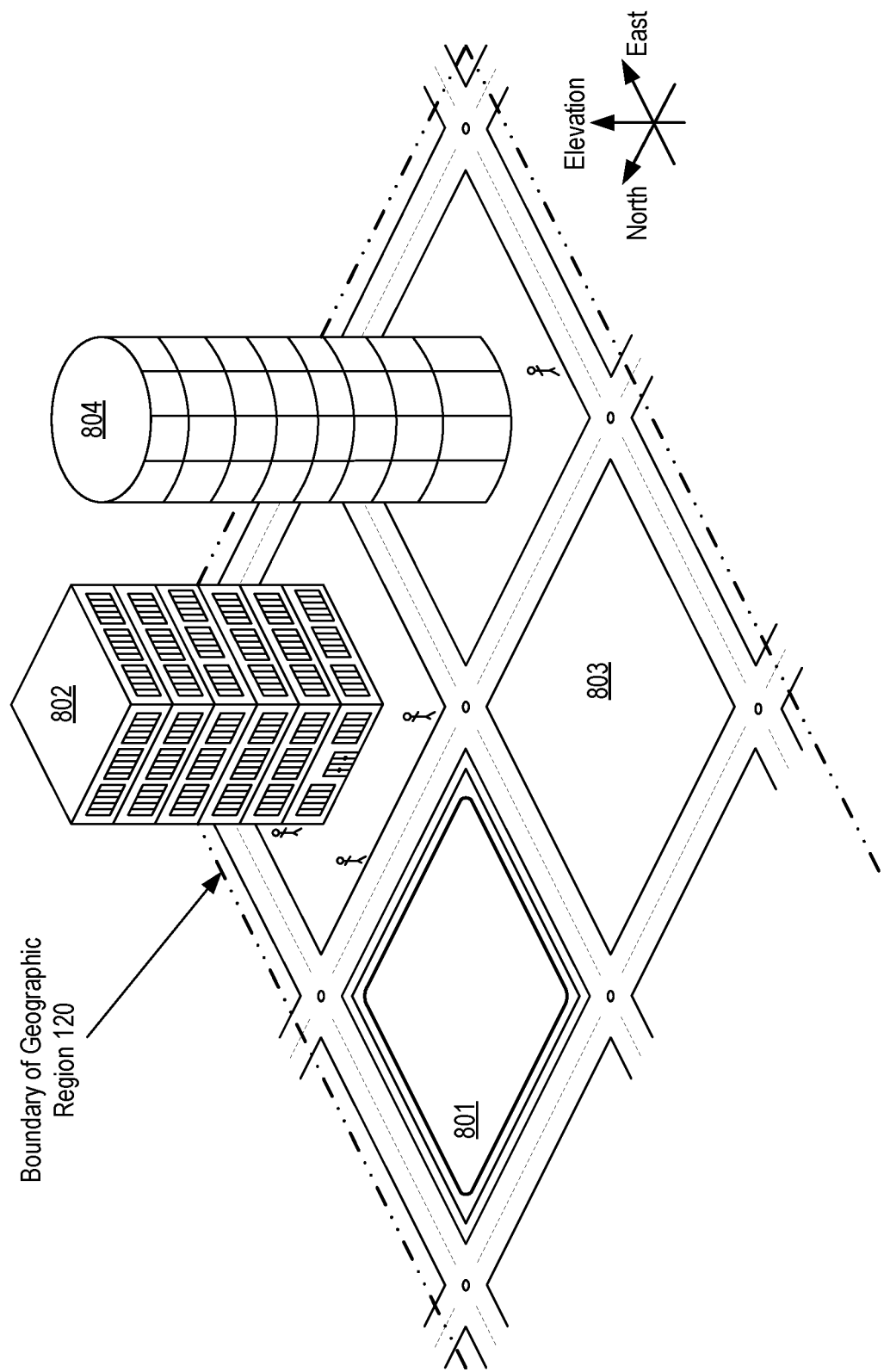
FIG. 9 depicts a map that is made of geographic region 120, including buildings.

FIG. 9 depicts a detailed map that is made of geographic region 120, which spans approximately four city blocks and comprises, among other elements, park 801, boxy building 802, empty lot 803, cylindrical building 804, and airport pressure station 114. It will be clear to those skilled in the art, after reading this disclosure, how to make and use alternative embodiments of the present invention that comprise any area, any geographic features, and any number, size, height, and shape of structures, such as buildings 802 and 804.

Figure 10:
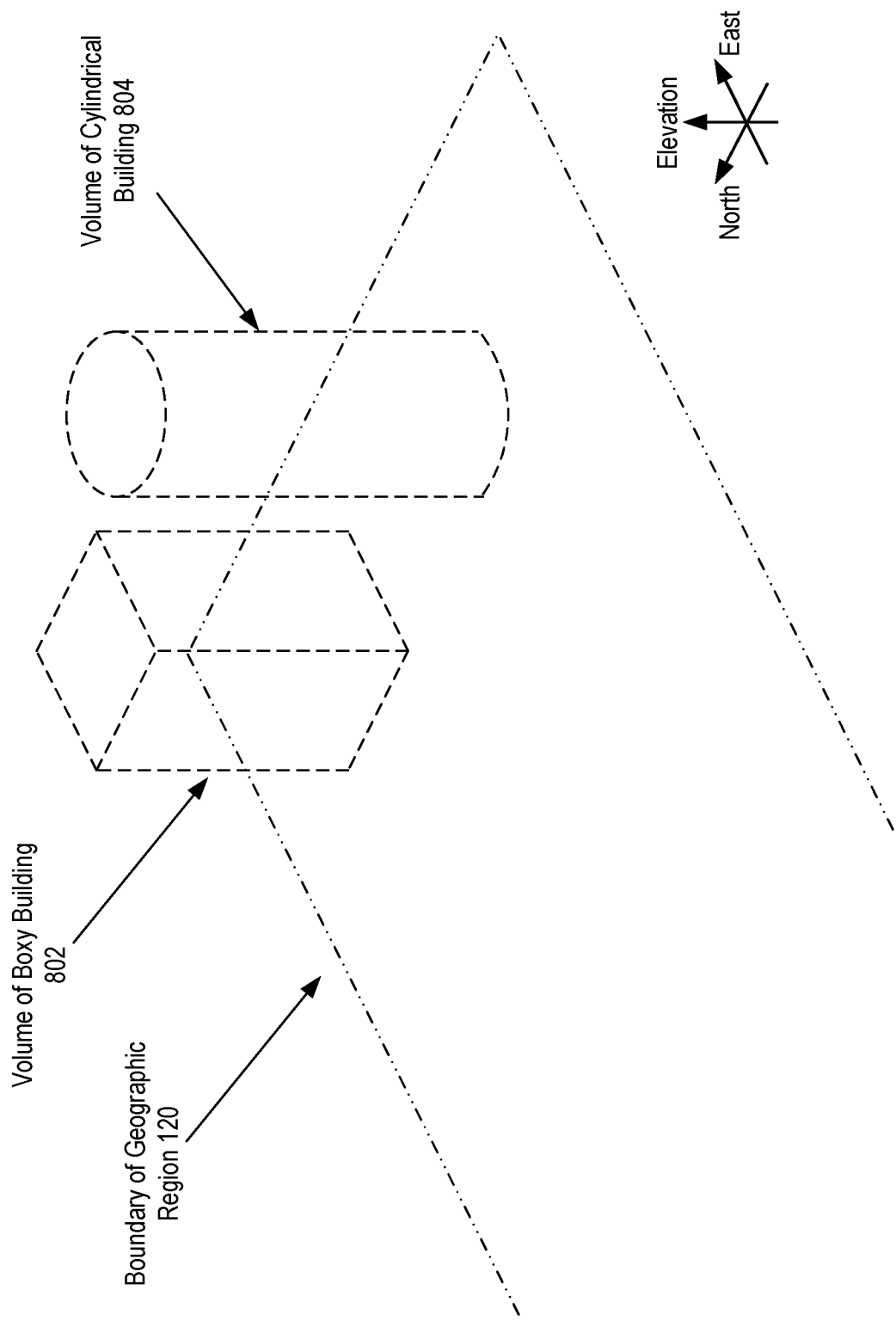
FIG. 10 depicts a three-dimensional survey of geographic region 120.

In accordance with the illustrative embodiment, as part of operation 603, the coordinate positions of the various features of one or more objects (e.g., buildings, structures, etc.) in geographic region 120 are determined and stored in the GIS database. The positions of one or more features of the objects can be determined by referencing the three-dimensional survey of geographic region 120, which is depicted in FIG. 10.

As described above, buildings 602 and 604 are represented with coordinates. As those who are skilled in the art will appreciate after reading this specification, in some embodiments of the present invention buildings 602 and 604, and objects in general, can be represented in a different way, such as by using a vector-based approach. For example and without limitation, one or more of the buildings in a geographic area can be described by a polygon shape of a building footprint, or rooftop, and the height of the building. Furthermore, any comparisons of distance can be made based on the polygon shape and/or polygon height stored, versus the coordinates stored.

Operation 505: Collect Temperature and Barometric Measurements—

Figure 11:
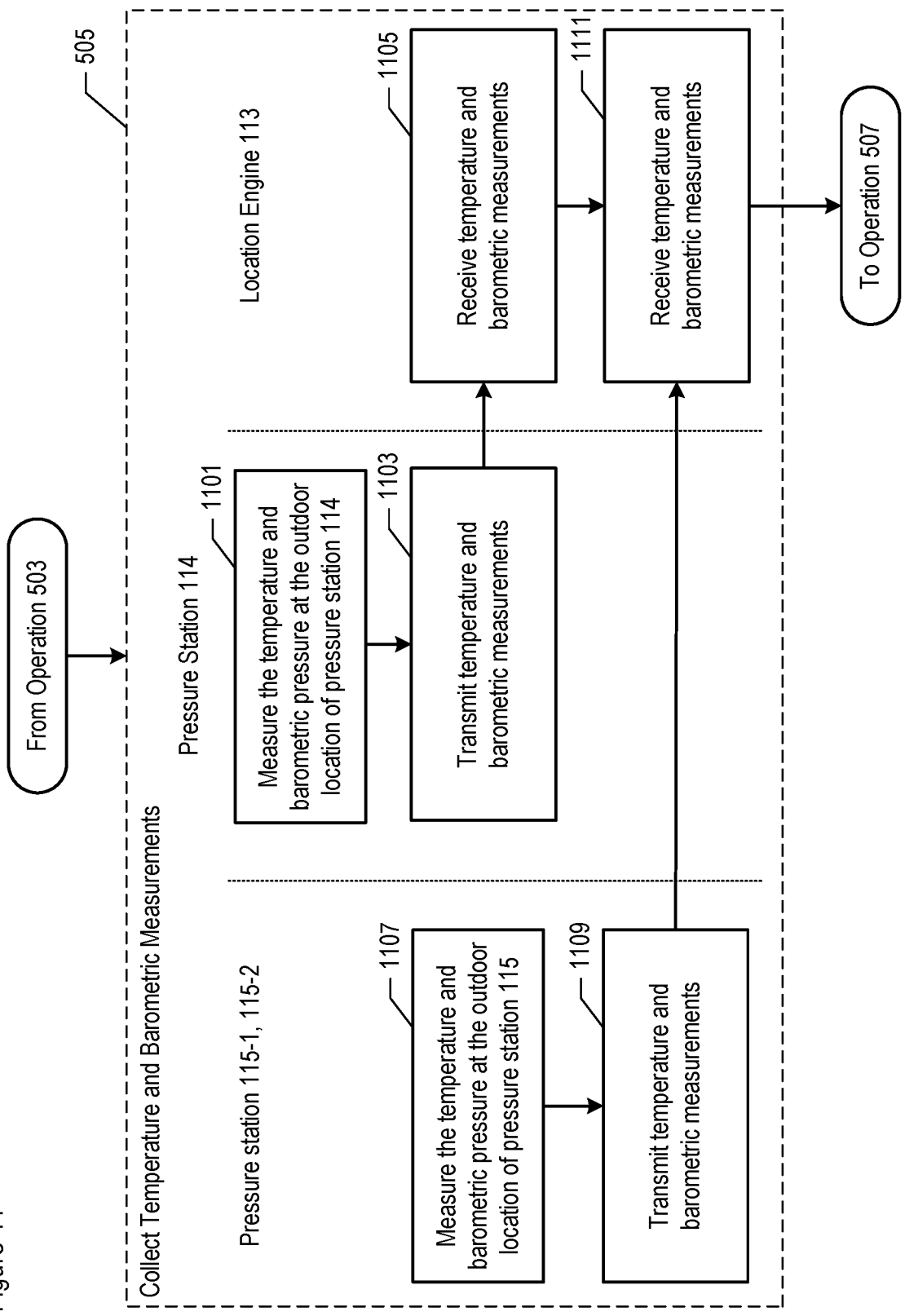
FIG. 11 depicts a flowchart of the salient processes performed in accordance with operation 505 of method 500.

FIG. 11 depicts a flowchart of the salient processes performed in accordance with operation 505.

In accordance with operation 1101, airport pressure station 114 measures samples of temperature, $T_W$, and barometric pressure, $P_W$, in its vicinity. In some embodiments of the present invention, each sample represents one measurement of temperature or of barometric pressure, while in some other embodiments each sample comprises more than one measurement of temperature or of barometric pressure.

In accordance with operation 1103, airport pressure station 114 transmits a measurement of temperature, $T_W$, (i.e., provides a measurement of temperature at the outdoor location of station 114) and atmospheric pressure, $P_W$, (i.e., provides a measurement of barometric pressure at the outdoor location of station 114) to location engine 113. In accordance with the illustrative embodiment, operation 1103 is performed every 10 minutes, but it will be clear to those skilled in the art how to make and use alternative embodiments of the present invention that transmit the measurements at other times.

In accordance with operation 1105, location engine 113 receives the measurement of temperature, $T_W$, and a measurement of atmospheric pressure, $P_W$, transmitted in accordance with operation 1103.

In accordance with operation 1107, each of pressure reference 115-1 and 115-2 measures samples of temperature, $T_C$, and barometric pressure, $P_C$, in its vicinity by using barometer 405. In some embodiments of the present invention, each sample represents one measurement of temperature or of barometric pressure, while in some other embodiments each sample comprises more than one measurement of temperature or of barometric pressure.

In accordance with operation 1109, each of pressure reference 115-1 and 115-2 transmits a measurement of temperature, $T_C$, and a measurement of atmospheric pressure, $P_C$, to location engine 113. In accordance with the illustrative embodiment, operation 1109 is performed every 10 minutes, but it will be clear to those skilled in the art how to make and use alternative embodiments of the present invention that transmit the measurements at other times.

In accordance with operation 1111, location engine 113 receives the measurement of temperature, $T_C$, and a measurement of atmospheric pressure, $P_C$, transmitted in accordance with operation 1109.

Operations 1101 through 1111 are performed continuously, concurrently, and asynchronously, in accordance with the illustrative embodiment.

Operation 505: Estimate Pressure Measurement Bias of Station 114—

Figure 12:
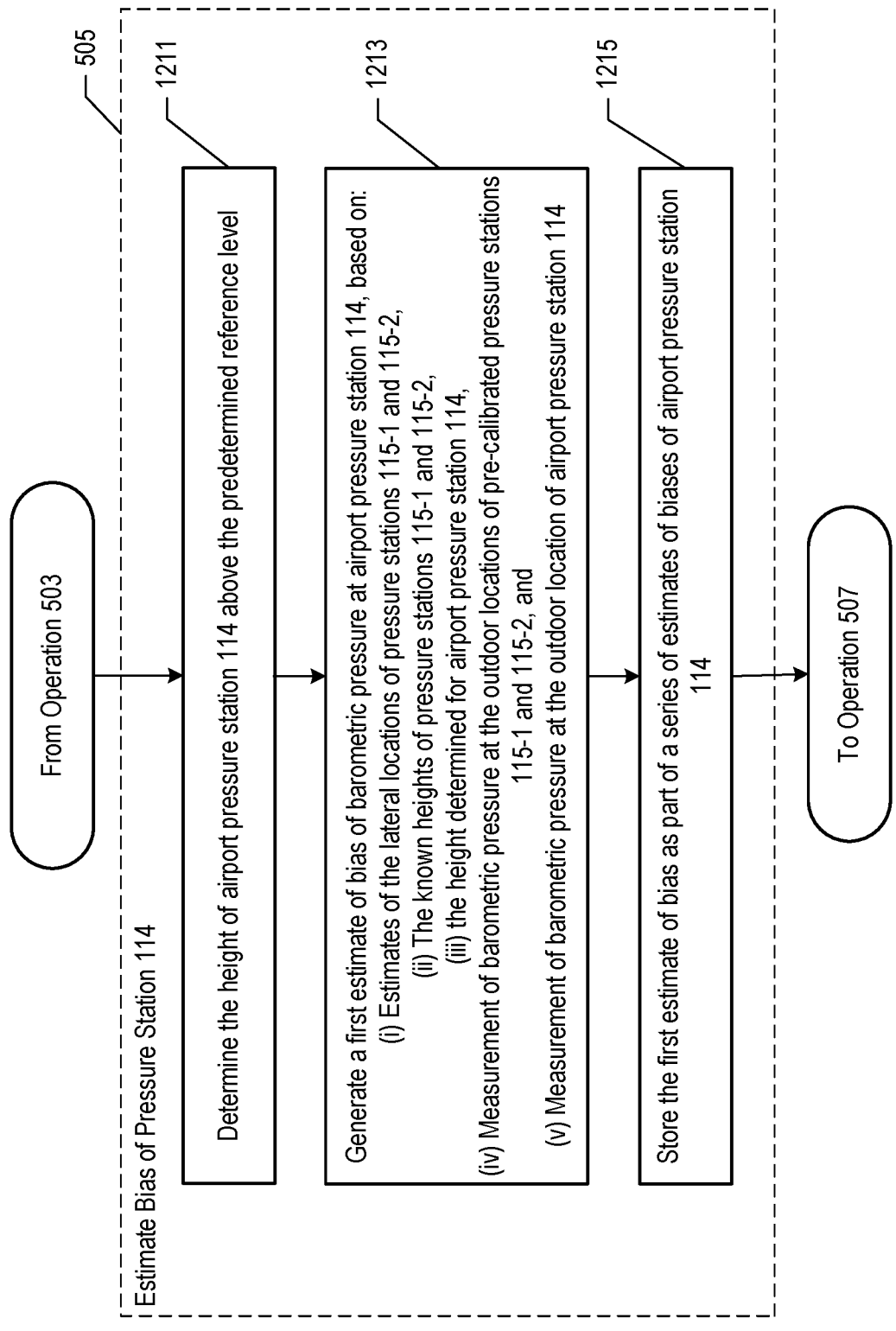
FIG. 12 depicts a flowchart of the salient processes performed in accordance with operation 505 of method 500.

FIG. 12 depicts a flowchart of the salient processes performed in accordance with operation 505.

In accordance with operation 1211, location engine 113 determines the height, $Z_W$, of airport pressure station 114 above a predetermined reference level. In some embodiments of the present invention, $Z_W$ is based on the height of at least one of pressure stations 115-1 and 115-2. For example and without limitation, location engine 113 assigns $Z_W$ a height value that is between those of stations 115-1 and 115-2, a height that is the same as, or similar to, the nearest of stations 115-1 and 115-2, and so on. In some other embodiments, location engine 113 assigns $Z_W$ a height value that is somewhere between that of ground level of a surveyed runway (e.g., by USGS, etc.) within airport property 701 and that of the top of the tower or roof of the tallest building nearby, wherein the information is stored in the GIS database.

In accordance with operation 1213, location engine 113 generates an estimate of bias of barometric pressure measured at airport pressure station 114, based on one or more of:

a. estimates of the lateral locations of pre-calibrated pressure stations 115-1 and 115-2, received in accordance with operation 503, b. the known heights of pressure stations 115-1 and 115-2, received in accordance with operation 503, c. the height of airport station 114, determined in accordance with operation 1211, d. one or more measurements of barometric pressure, $P_W$, in a first series of measurements, taken at the outdoor location of airport pressure station 114, received in accordance with operation 505, and e. one or more measurements of barometric pressure, $P_C$, in a second and third series of measurements, taken at the outdoor locations of pressure stations 115-1 and 115-2, respectively, received in accordance with operation 505.

Location engine 113 generates the estimate of bias of barometric pressure by comparing i) the outdoor barometric pressure (i.e., the measured pressure) measured by airport pressure station 114 at its unknown height above mean sea level (MSL) and ii) the outdoor barometric pressure (i.e., the expected pressure) that corresponds to an assumed or derived height above MSL of airport pressure station 114, while accounting for the known heights of pre-calibrated pressure stations 115-1 and 115-2. The details of these operations are provided as a part of three illustrative scenarios described below. Location engine 113 uses outdoor pressure measurements, $P_C$, made by pre-calibrated pressure stations 115-1 and 115-2 that correspond in time to those measurements, $P_W$, made by as-yet-uncalibrated airport pressure station 114 (i.e., are correlated or overlapping in time).

The received measurements of the barometric pressure at pre-calibrated pressure stations 115-1 and 115-2 are some of the components for establishing the barometric pressure that corresponds to an assumed or derived height (i.e., derived in accordance with operation 1211) of airport station 114 when it made the barometric pressure measurement. For example, location engine 113 can derive a local barometric pressure, and, for that matter, an estimated vertical height or ground level, for the lateral location at which airport station 114 provided the pressure measurements. Location engine 113 is able to do so based on one or more of the pressure measurements at stations 115-1 and 115-2, by accounting for certain differences between the lateral location of airport station 114 and the locations of the one or more pressure stations 115-1 and 115-2, and by accounting for the height (when provided) of airport station 114.

There are three scenarios that involve at least one of i) an unknown height of airport pressure station 114 and ii) an unknown measurement bias of station 114, as described below. For clarity purposes, a single pre-calibrated pressure station 115-1 is used in the scenarios.

Unknown (or Incorrect) Height and Known Measurement Bias—

In this first scenario, location engine 113 compares i) the pressure measurements from pre-calibrated pressure station 115-1 having a known height above MSL and calibrated reference pressure, with ii) the pressure measurements from airport pressure station 114. Nominally, the difference in pressure corresponds directly to the difference in station heights. Thus, location engine 113 is able to determine the height of airport pressure station 114.

As an example, station 115-1 is known to be at 101.0 meters (m) MSL and provides one or more calibrated readings of 997.0 millibars (mbar) absolute pressure, and airport pressure station 114 is providing readings at 995.5 mbar. As a result, height above MSL of the airport pressure station is:

$$(101.0 \text{ m} + 9.1 \text{ m/mbar} * 1.5 \text{ mbar delta}), \text{ or } 114.65 \text{ m}. \quad \text{(Eq. 2)}$$

For purposes of clarity, the foregoing equation, as well as others appearing below, incorporates an assumption that one millibar of change represents 9.1 m in height difference. As those who are skilled in the art will appreciate, after reading this specification, various factors can be accounted for in order to better characterize the relationship between height difference and the pressure change at this particular elevation, such as temperature and humidity of the column of air overhead, gravity, and the current height.

Known Height and Unknown (or Incorrect) Measurement Bias—

In this second scenario, airport pressure station 114's barometer height has been ascertained to be exactly 114.65 m MSL; however, the same barometer sensor has a pressure measurement error that is unknown. Location engine 113 compares the known height above MSL and calibrated reference pressure at station 115-1, with the known height (in this scenario) and barometer measurement of airport station 114, in order to estimate the bias of the pressure measurement at station 114.

As an example, station 115-1 is known to be at 101.0 m MSL and provides one or more calibrated readings of 997.0 mbar reference pressure, and airport pressure station 114 has been previously surveyed to be exactly at 114.65 m MSL. The airport pressure station reports an uncalibrated reading of 994.3 mbar. Location engine 113 determines that the pressure at the airport station barometer should actually be (i.e., is expected to be):

$$(114.65 \text{ m} - 101.0 \text{ m})/(\sim 9.1 \text{m/mbar}) + 997 \text{ mbar} = 995.5 \text{ mbar}. \quad \text{(Eq. 3)}$$

This means that there is a minus 1.2 mbar bias that should be applied to measurements taken by this station, in order to correct the station pressure. Going forward, location engine 113 applies this bias to subsequent readings provided by airport pressure station 114 in accordance with operation 1401 below, before estimating the elevation of wireless terminal 101 in accordance with operation 1403.

Unknown (or Incorrect) Height and Unknown (or Incorrect) Measurement Bias—

In this third scenario, airport pressure station 114's barometer height is erroneously reported or estimated to be five meters higher than actual during a survey: 119.65 m MSL estimated versus 114.65 m MSL actual. Station 114 reports pressure measurements as 1000 mbar, whereas actual pressure is 994.5 mbar at 114.65 m. Pressure station 115-1 is at a known height of 101.0 m MSL and reports calibrated reference pressure as 997.0 mbar. The estimated bias of measurement at airport pressure station 114 can be expressed as the station reading minus the predicted reading; using pre-calibrated station 115-1's known height and calibrated pressure readings, the bias is calculated to be:

$$1000\ mbar-(997.0\ mbar+(101.0\ mbar-119.65\ mbar)/9.1\ m/mbar),\ or \qquad (Eq.\ 4)$$

$$1000\ mbar-994.95\ mbar=5.05\ mbar\ at\ the\ estimated\ 119.65\ m\ height. \qquad (Eq.\ 5)$$

Hypothetically, and based on the foregoing calculation, if location engine 113 were to estimate the elevation of wireless terminal 101 if the terminal were at the same height as the actual airport station height of 114.65 m at the same point in time, then for a pressure of 995.5 mbar being reported by the wireless terminal, airport pressure station 114 with incorrect height of 119.65 m would have a bias-adjusted pressure (i.e., adjusted by "BIAS") of:

$$(1000\ mbar-BIAS)=(1000\ mbar-5.05\ mbar)=994.95\ mbar. \qquad (Eq.\ 6)$$

Then, location engine 113 would determine the height of wireless terminal 101 with a 995.5 mbar reading, as being:

$$119.65\ m-((995.5\ mbar-994.95\ mbar)*(\sim 9.1 m/mbar)),\ or \qquad (Eq.\ 7)$$

$$119.65m-5.0\ m=114.65\ m\ MSL,\ which\ is\ the\ correct\ height. \qquad (Eq.\ 8)$$

The foregoing example demonstrates that a small height error in the estimated height of airport pressure station 114 is compensated for with additional bias with respect to pre-calibrated pressure station 115-1 and that erroneous height information for airport pressure station 114 does not affect estimates of the elevation of wireless terminal 101.

In accordance with operation 1215, location engine 113 stores the estimate of bias as part of a series of estimates of bias of barometric pressure at airport pressure station 114, wherein the series further comprises estimates of bias generated in previous or subsequent iterations of operation 505. In some embodiments of the present invention, location engine 113 performs calibration of airport station 114's barometer repeatedly (e.g., periodically, sporadically, on-demand, etc.), in order to account for any drift or trend of the barometric pressure measurements that can be attributed to the aging of the barometric sensor and other possible characteristics (e.g., temperature, humidity, etc.), temporal-dependent or otherwise. In some embodiments of the present invention, location engine 113 triggers re-calibration based on a predefined change in temperature and/or humidity measured by airport station 114, over a period of time.

The following scenario is an illustrative application for using the stored biases. By assuming a predetermined maximum pressure error—for example, 0.2 mbar which corresponds to approximately two meters of height—for airport pressure station 114 whose barometer sensor has drifted from its factory-calibrated value, it can be assumed that any additional correction with respect to reference station 115-1 of greater than the 0.2 mbar should be applied to a height correction by converting that additional pressure to a new height. By keeping a long-term history of pressure bias and height corrections (e.g., over many months, over many years, etc.) as airport station 114 is repeatedly calibrated or replaced with a calibrated sensor, this height error should converge to actual station height.

For example, if the bias offset for airport station 114 with less than perfectly-determined height and having an older station pressure sensor that is found to be 0.35 mbar off, it can be assumed that a maximum of 0.2 mbar is from the pressure sensor internal error (bias) and that the remaining error—in this case, 0.15 mbar—is likely due to a needed correction in station height. In this case, location engine 113 adjusts the height calculated for station 114 by about 1.37 m, which is (0.15 mbar*9.1 m/mbar), with the objective of getting closer to the actual height. Additionally, by checking in advance that the new height is between ground level and roof level of the tallest nearby building, or between a different pair of boundary conditions, it can be assumed that an extremely off-pressure sensor with greater than 0.2 mbar of bias can still be corrected by ensuring that the height is within the ground and building envelope.

Operation 509: Collect Temperature and Barometric Measurements—

Figure 13:
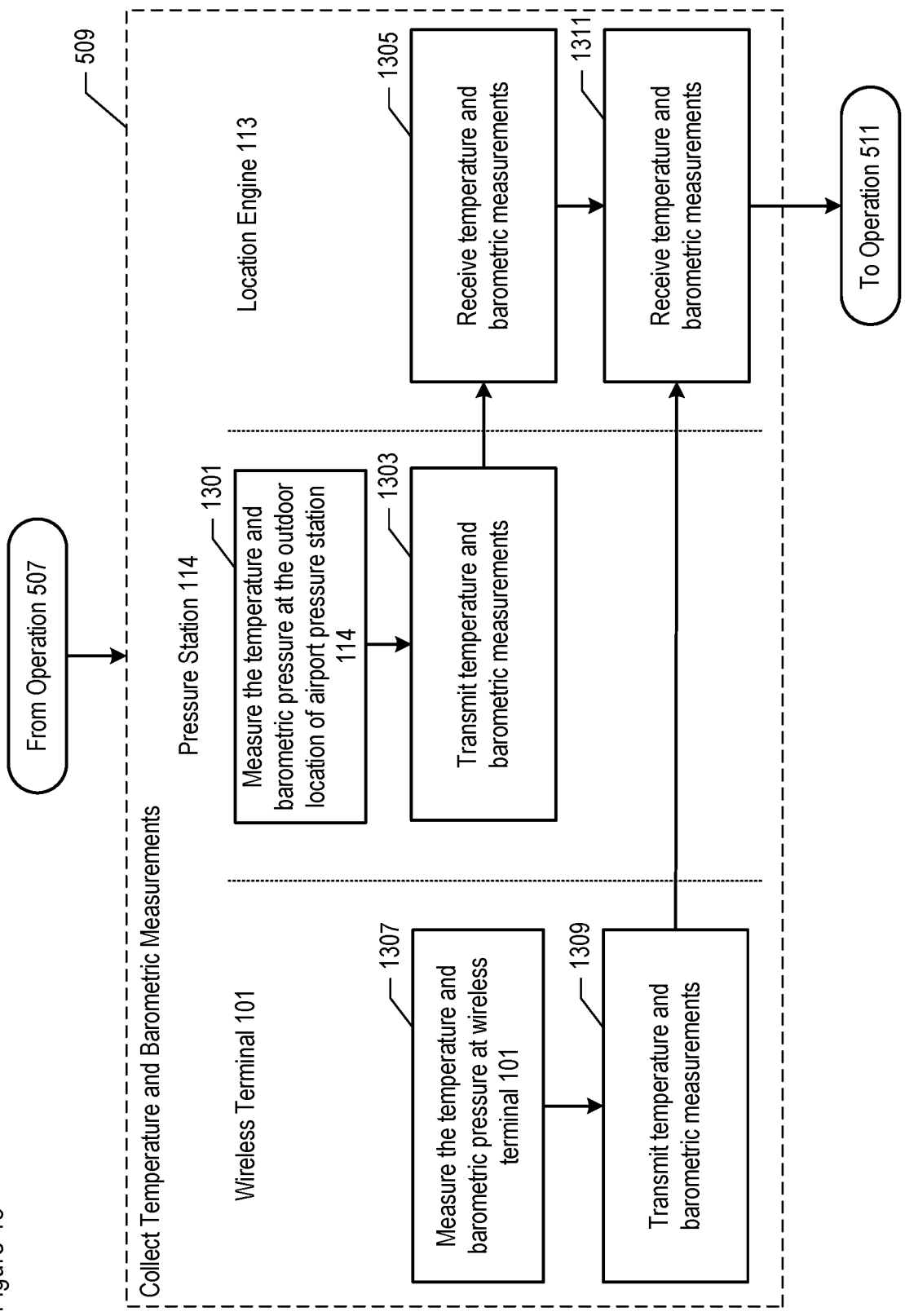
FIG. 13 depicts a flowchart of the salient processes performed in accordance with operation 509 of method 500.

FIG. 13 depicts a flowchart of the salient processes performed in accordance with operation 509.

In accordance with operation 1301, airport pressure station 114 measures samples of temperature, $T_W$, and barometric pressure, $P_W$, in its vicinity. In some embodiments of the present invention, each sample represents one measurement of temperature or of barometric pressure, while in some other embodiments each sample comprises more than one measurement of temperature or of barometric pressure.

In accordance with operation 1303, airport pressure station 114 transmits a measurement of temperature, $T_W$, (i.e., provides a measurement of temperature at the outdoor location of station 114) and atmospheric pressure, $P_W$, (i.e., provides a measurement of barometric pressure at the outdoor location of station 114) to location engine 113. In accordance with the illustrative embodiment, operation 1303 is performed every 10 minutes, but it will be clear to those skilled in the art how to make and use alternative embodiments of the present invention that transmit the measurements at other times.

In accordance with operation 1305, location engine 113 receives the measurement of temperature, $T_W$, and a measurement of atmospheric pressure, $P_W$, transmitted in accordance with operation 1303.

In accordance with operation 1307, wireless terminal 101 measures samples of temperature, $T_T$, and barometric pressure, $P_T$, in its vicinity by using barometer 205. In some embodiments of the present invention, each sample represents one measurement of temperature or of barometric pressure, while in some other embodiments each sample comprises more than one measurement of temperature or of barometric pressure. In accordance with the illustrative embodiment, a measurement of temperature or of barometric pressure is taken once per second, but it will be clear to those skilled in the art how to make and use alternative embodiments of the present invention that take the measurements at a different rate (e.g., 5 per second, 10 per second, etc.).

In accordance with operation 1309, wireless terminal 101 transmits a measurement of temperature, $T_T$, and a measurement of atmospheric pressure, $P_T$, to location engine 113. In accordance with the illustrative embodiment, operation 1309 is performed every 5 seconds, but it will be clear to those skilled in the art how to make and use alternative embodiments of the present invention that transmit the measurements at other times.

In accordance with operation 1311, location engine 113 receives the temperature and atmospheric measurements transmitted in accordance with operation 1309. In some embodiments of the present invention, location engine 113 combines the values of multiple pressure samples (e.g., by calculating a median, etc.) in order to reduce measurement noise.

Operations 1301 through 1311 are performed continuously, concurrently, and asynchronously, in accordance with the illustrative embodiment.

Operation 513: Generate an Estimate of Elevation—

Figure 14:
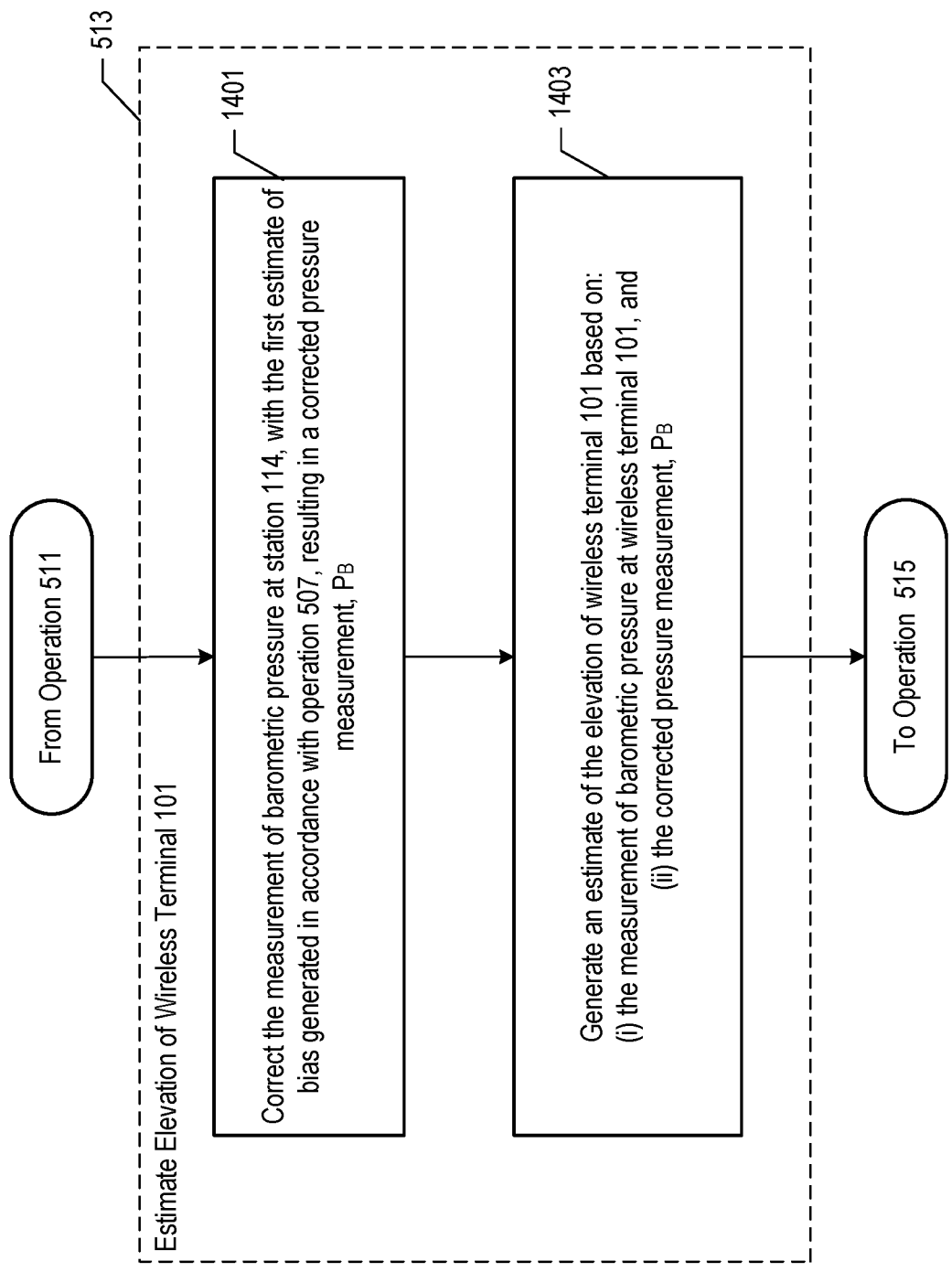
FIG. 14 depicts a flowchart of the salient processes performed in accordance with operation 513 of method 500.

FIG. 14 depicts a flowchart of the salient processes performed in accordance with operation 513.

At operation 1401, location engine 113 corrects the current pressure measurement $P_W$ by applying to it the estimate of bias that is determined in accordance with operation 507. It will be clear to those who are skilled in the art, after reading this specification, how to apply (e.g., add, subtract, etc.) a single estimate of bias based on how the estimation process is implemented.

In some embodiments of the present invention, two or more biases from the series of biases stored and maintained in accordance with operation 1215, are applied to the current pressure measurement, for example, by an exponential average, a differently weighted average, a straight average, and so on. In some embodiments of the present invention, the one or more biases are applied based on seasonal conditions or diurnal conditions.

At operation 1403, location engine 113 generates an estimate of the elevation of wireless terminal 101 that is based on pressure data and outdoor scale height. The estimate, $Z_T$, is based on:

$$Z_T = -H_{OUT} \cdot \ln\left(\frac{P_T}{P_B}\right) + Z_W \quad \text{(Eq. 9)}$$

wherein:
- $H_{OUT}$ is the outdoor scale height of the atmosphere, which is the elevation at which the atmospheric pressure has decreased to $e^{-1}$ times its value at mean sea level (e.g., approximately 8400 meters) and is based on outdoor temperature, $T_W$.
- $P_T$ is the relevant measurement of barometric pressure received from wireless terminal 101,
- $P_B$ is the measurement of atmospheric pressure at airport pressure station 114 (in Pascals) corrected for measurement bias in accordance with operation 1401, and
- $Z_W$ is the elevation of airport pressure station 114, determined in accordance with operation 1211.

In some embodiments of the present invention, measurements $P_T$ and $P_W$ are used that coincide in time with $T_T$ and $T_W$ as closely as possible. In accordance with the illustrative embodiment, location engine 113 has access to multiple airport pressure stations, such as airport pressure station 114, and uses a pressure measurement $P_W$ from the particular airport pressure station that is the closest in distance to the lateral location estimated in accordance with operation 511. In some embodiments of the present invention, location engine 113 uses measurements from the airport pressure station that is most relevant to the lateral location estimated in accordance with operation 511, in some way other than being closest in distance.

As those who are skilled in the art will appreciate after reading this specification, in some alternative embodiments $Z_T$ can be determined using a different equation than that described above. Additionally, in some embodiments of the present invention $Z_T$ can also be based on the lateral location of wireless terminal 101 estimated in accordance with operation 407. In some embodiments of the present invention, location engine 113 accounts for indoor and/or outdoor temperatures, stack effects in a building, and so on.

Figure 15A:
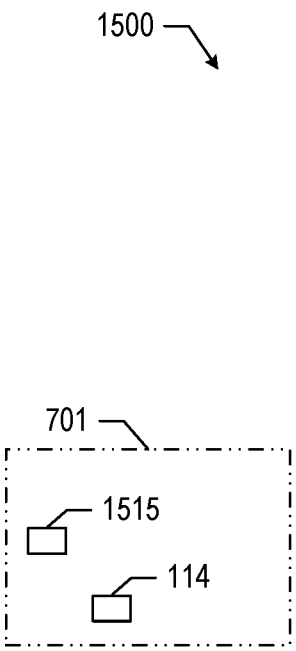
FIGS. 15A and 15B depict maps of the ground level of geographic region 1500, with pressure reference 1515 at a first and second airport, respectively.
Figure 15A:
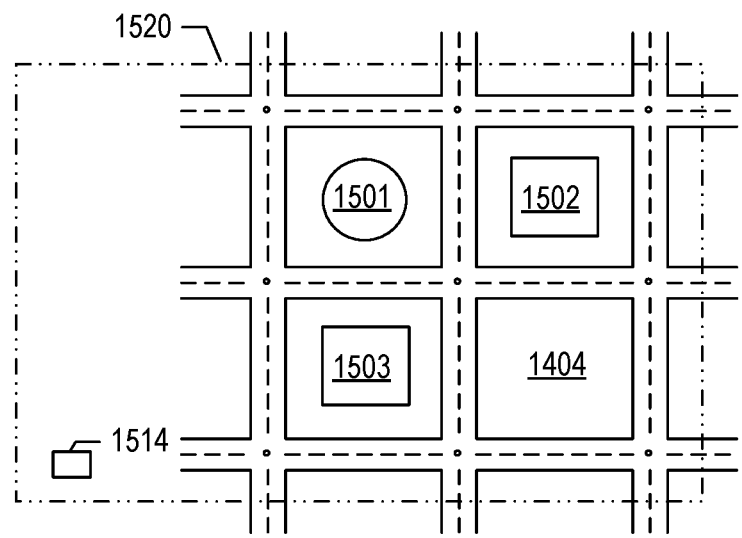
Figure 15B:
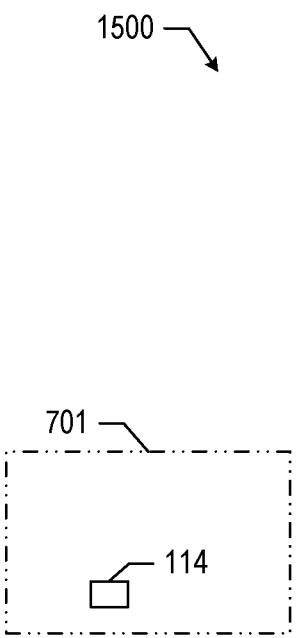
Figure 15B:
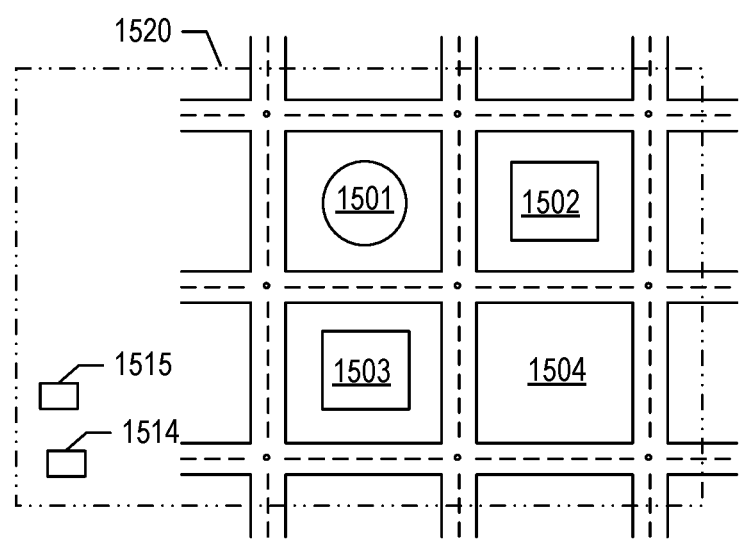

A variation of the illustrative embodiment that features calibration across multiple airport pressure stations is now described. FIGS. 15A and 15B each depict a detailed map of the ground level of geographic region 1500, in accordance with the illustrative embodiment. Region 1500 comprises i) first airport pressure station 114 at the first airport (e.g., Chicago O'Hare International Airport, etc.) within region 701 as in FIG. 7A and ii) geographic region 1520. Geographic region 1520 itself comprises buildings 1501 through 1503 and lot 1504 within an urban environment, and second airport pressure station 1514 at a second airport (e.g., Miami International Airport, etc.). The elements within region 1500 as depicted as not necessarily drawn to scale geographically. For example, airport pressure station 1514 is depicted as being relatively close to the cluster of buildings in order to both fit all of the described elements within the same figure and provide sufficient detail for each element.

A variation of the illustrative embodiment involves the use of transportable pressure reference 1515, in concert with the technique of estimating measurement bias of airport pressure station 114. In the following example, the estimate of bias of airport pressure station 114 has already been determined by using pre-calibrated pressure stations 115-1 and/or 115-2, and also method 500. Pressure reference 1515 is on an airplane that originates at the first airport within region 701, as depicted in FIG. 15A, and that flies to the second airport within region 1520, as depicted in FIG. 15B. Pressure reference 1515 can be part of the airplane's barometric altimeter, can be part of a wireless terminal on an airplane (e.g., a crewmember's or passenger's wireless terminal, etc.), or embodied in a different piece of equipment that flies on the airplane from the first to second airport. In the example, the barometer of pressure reference 1515 is not calibrated, at least not initially, but is capable of providing measurements of barometric pressure in a manner similar to that of station 115-1 and/or wireless terminal 101 as described earlier (e.g., to the National Weather Service, etc.). For instance, some airplanes are capable of publishing their pressure logs, which can be made available to location engine 113.

In the example, location engine 113 first estimates the bias of barometric pressure measured by airport station 114, in accordance with operation 507.

Location engine 113 retrieves barometric pressure measurements provided by pressure reference 1515 for when the pressure reference is in region 701, as in FIG. 15A.

Location engine 113 also retrieves barometric pressure measurements provided by pressure reference 1515 for when the pressure reference is in region 1520, as in FIG. 15B.

Location engine 113 determines the difference between the pressure measurements corresponding to region 1520 and those of region 701. After accounting for the differences in local weather conditions between regions 1520 and 701, location engine 113 attributes the difference in pressure measurements to the difference in elevations between pressure station 1514 (in region 1520) and pressure station 114 (in region 701). Because it has already calibrated pressure station 114, and it has determined the difference in elevations, location engine 113 can now determine the elevation of pressure station 1514 and consequently the bias of station 1514.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving, by a data processing system, a first series of measurements of barometric pressure made at a first pressure reference, wherein the first pressure reference is at a first outdoor location;
receiving, by the data processing system, a second series of measurements of barometric pressure made at a second pressure reference, wherein the second pressure reference is at a second outdoor location and at a first known height above the reference level, the first known height being known to the data processing system;
generating, by the data processing system, a first estimate of bias of barometric pressure measured by the first pressure reference based on:
(i) the first series of measurements of the barometric pressure made at the first pressure reference,
(ii) the second series of measurements of the barometric pressure made at the second pressure reference, and
(iii) the first known height of the second pressure reference;
receiving, by the data processing system, a third series of measurements of barometric pressure made at a third pressure reference when in a first region;
receiving, by the data processing system, a fourth series of measurements of the barometric pressure made at the third pressure reference after being transported to a second region, wherein the second region is geographically separate from the first region; and
generating, by the data processing system, a second estimate of bias of barometric pressure measured by a fourth pressure reference in the second region based on:
(i) a difference between the third and fourth series of measurements of the barometric pressure made at the third pressure reference,
(ii) differences in local weather conditions between the first and second regions, and
(iii) the first estimate of the bias.

2. The method of claim 1 further comprising transmitting the first estimate of the bias to a location-based application server.

3. The method of claim 1 further comprising generating an estimate of elevation of a first wireless terminal, wherein the estimate of the elevation of the first wireless terminal is based on the second estimate of the bias.

4. The method of claim 1, wherein the first pressure reference is at an unknown height above a reference level, the unknown height being unknown to the data processing system.

5. The method of claim 1 wherein the first pressure reference is on a first premises and the second pressure reference is off the first premises.

6. The method of claim 5 wherein the first pressure reference is a weather station at a first airport and the first premises is the premises of the first airport.

7. The method of claim 5, wherein the first region is defined by a property boundary of the first premises.

8. The method of claim 5, wherein the first region is defined by a property boundary of the first premises, wherein the first premises is the premises of a first airport, and wherein the third pressure reference is on an airplane at the first airport when the third pressure reference makes the third series of measurements.

9. The method of claim 8, wherein the third pressure reference is on the airplane at a second airport in the second region when the third pressure reference makes the fourth series of measurements.

10. The method of claim 8, wherein the third pressure reference is part of a barometric altimeter of the airplane.

11. The method of claim 1, wherein the third pressure reference is part of a first wireless terminal.

12. A method comprising:
receiving, by a data processing system, a first series of measurements of barometric pressure made at a first pressure reference, wherein the first pressure reference is at a first outdoor location and on a first premises;
receiving, by the data processing system, a second series of measurements of barometric pressure made at a second pressure reference, wherein the second pressure reference is at a second outdoor location and off the first premises;
generating, by the data processing system, a first estimate of bias of barometric pressure measured by the first pressure reference based on:
(i) the first series of measurements of the barometric pressure made at the first pressure reference, and
(ii) the second series of measurements of the barometric pressure made at the second pressure reference;
receiving, by the data processing system, a third series of measurements of barometric pressure made at a third pressure reference when in a first region, wherein the first region is defined by a property boundary of the first premises;
receiving, by the data processing system, a fourth series of measurements of the barometric pressure made at the third pressure reference after being transported to a second region, wherein the second region is geographically separate from the first region; and
generating, by the data processing system, a second estimate of bias of barometric pressure measured by a fourth pressure reference in the second region based on:
(i) a difference between the third and fourth series of measurements of the barometric pressure made at the third pressure reference,
(ii) differences in local weather conditions between the first and second regions, and
(iii) the first estimate of the bias.

13. The method of claim 12, wherein the first premises is the premises of a first airport, and wherein the third pressure reference is on an airplane at the first airport when the third pressure reference makes the third series of measurements.

14. The method of claim 13, wherein the third pressure reference is on the airplane at a second airport in the second region when the third pressure reference makes the fourth series of measurements.

15. The method of claim 13, wherein the third pressure reference is part of a barometric altimeter of the airplane.

16. The method of claim 12, wherein the third pressure reference is part of a first wireless terminal.

17. The method of claim 12 further comprising generating an estimate of elevation of a first wireless terminal, wherein the estimate of the elevation of the first wireless terminal is based on the second estimate of the bias.

18. A method comprising:
receiving, by a data processing system, a first series of measurements of barometric pressure made at a first pressure reference, wherein the first pressure reference is at a first outdoor location;
receiving, by the data processing system, a second series of measurements of barometric pressure made at a second pressure reference, wherein the second pressure reference is at a second outdoor location;

generating, by the data processing system, a first estimate of bias of barometric pressure measured by the first pressure reference based on:
(i) the first series of measurements of the barometric pressure made at the first pressure reference, and
(ii) the second series of measurements of the barometric pressure made at the second pressure reference;

receiving, by the data processing system, a third series of measurements of barometric pressure made at a third pressure reference when in a first region, wherein the third pressure reference is at a first airport within the first region when the third pressure reference makes the third series of measurements;

receiving, by the data processing system, a fourth series of measurements of the barometric pressure made at the third pressure reference after being transported to a second region, wherein the third pressure reference is at a second airport in the second region when the third pressure reference makes the fourth series of measurements; and generating, by the data processing system, a second estimate of bias of barometric pressure measured by a fourth pressure reference in the second region based on:
(i) a difference between the third and fourth series of measurements of the barometric pressure made at the third pressure reference,
(ii) differences in local weather conditions between the first and second regions, and
(iii) the first estimate of the bias.

19. The method of claim 18, wherein the third pressure reference is part of a barometric altimeter of an airplane that takes off from the first airport and lands at the second airport.

20. The method of claim 18, wherein the third pressure reference is part of a first wireless terminal.

21. The method of claim 18 further comprising generating an estimate of elevation of a first wireless terminal, wherein the estimate of the elevation of the first wireless terminal is based on the second estimate of the bias.

* * * * *